US012705859B2

(12) United States Patent
Gintsburg et al.

(10) Patent No.: US 12,705,859 B2
(45) Date of Patent: Aug. 11, 2026

(54) SYSTEMS AND METHODS FOR OBJECT-BASED DYNAMIC TONE ADJUSTMENT

(71) Applicant: QUALCOMM Incorporated, San Diego, CA (US)

(72) Inventors: Mark Gintsburg, Haifa (IL); Eran Pinhasov, Zichron Yaakov (IL)

(73) Assignee: QUALCOMM Incorporated, San Diego, CA (US)

(*) Notice: Subject to any disclaimer, the term of this patent is extended or adjusted under 35 U.S.C. 154(b) by 309 days.

(21) Appl. No.: 18/451,347

(22) Filed: Aug. 17, 2023

(65) Prior Publication Data

US 2024/0273858 A1 Aug. 15, 2024

Related U.S. Application Data

(60) Provisional application No. 63/484,708, filed on Feb. 13, 2023.

(51) Int. Cl.

| | |
|---|---|
| ***G06V 10/56*** | (2022.01) |
| ***G06T 7/90*** | (2017.01) |
| ***G06V 10/25*** | (2022.01) |
| ***G06V 10/60*** | (2022.01) |
| ***H04N 1/60*** | (2006.01) |

(52) U.S. Cl.

CPC ................ *G06V 10/56* (2022.01); *G06T 7/90* (2017.01); *G06V 10/25* (2022.01); *G06V 10/60* (2022.01); *H04N 1/60* (2013.01); *G06T 2207/10024* (2013.01); *G06T 2207/30201* (2013.01)

(58) Field of Classification Search

CPC ........ G06V 10/56; G06V 10/25; G06V 10/60; G06T 7/90; G06T 2207/10024; G06T 2207/30201

See application file for complete search history.

(56) References Cited

U.S. PATENT DOCUMENTS

| | | | | |
|---|---|---|---|---|
| 7,903,178 | B1 | 3/2011 | Balram et al. | |
| 2004/0208363 | A1 | 10/2004 | Berge et al. | |
| 2009/0295824 | A1 | 12/2009 | Shirata | |
| 2020/0302656 | A1* | 9/2020 | Kumar | G06T 11/10 |
| 2021/0286975 | A1* | 9/2021 | Sun | G06V 10/758 |

OTHER PUBLICATIONS

NPL: NPL Results Publication Date Range: Jan. 9, 2003 to Jul. 22, 2025.*

NPL: InnovationQ+ by IP.com and IEEE: Results Publication Date Range: Jul. 19, 2001 to Jan. 6, 2026.*

International Search Report and Written Opinion—PCT/US2024/015246—ISA/EPO—Jun. 10, 2024.

* cited by examiner

*Primary Examiner* — Quang N Vo

(74) *Attorney, Agent, or Firm* — QUALCOMM Incorporated

(57) ABSTRACT

Imaging systems and techniques are described. In some examples, an imaging system receives an image captured by an image sensor. The imaging system determines that an image region in the image includes a representation of an object of a specified category. The imaging system adjusts a hue (and/or saturation and/or brightness) of at least one pixel of the representation of the object in the image region to a specified hue (and/or saturation and/or brightness) to generate a processed image.

30 Claims, 15 Drawing Sheets

500

1150

SYSTEMS AND METHODS FOR OBJECT-BASED DYNAMIC TONE ADJUSTMENT

CROSS-REFERENCE TO RELATED APPLICATIONS

This application claims the benefit of U.S. Provisional Application No. 63/484,708, filed Feb. 13, 2022 and titled "Systems and Methods for Object-Based Dynamic Tone Adjustment," which is hereby incorporated by reference in its entirety and for all purposes.

FIELD

This application is related to image capture and processing. More specifically, this application relates to systems and methods of detecting skin (e.g., of a person's face, hands, or other body part(s)) in an image and adjusting skin tone in the image.

BACKGROUND

Many devices include one or more cameras. For example, a smartphone or tablet includes a front facing camera to capture selfie images and a rear facing camera to capture an image of a scene (such as a landscape or other scenes of interest to a device user). A camera can capture images using an image sensor of the camera, which can include an array of photodetectors. Some devices can analyze image data captured by an image sensor to detect an object within the image data. Sometimes, cameras can be used to capture images of scenes that include one or more people.

BRIEF SUMMARY

Systems and techniques are described for imaging. In some examples, an imaging system receives an image captured by an image sensor. The imaging system determines that an image region in the image includes a representation (e.g., depiction) of an object of a specified category. The imaging system adjusts a hue (and/or saturation and/or brightness) of at least one pixel of the representation of the object in the image region to a specified hue (and/or saturation and/or brightness) to generate a processed image.

According to at least one example, a method is provided for imaging. The method includes: receiving an image captured by an image sensor; determining that an image region in the image includes a representation of an object of a specified category; and adjusting a hue of at least one pixel of the representation of the object in the image region to a specified hue to generate a processed image.

In another example, an apparatus for imaging is provided that includes at least one memory and at least one processor coupled to the at least one memory. The at least one processor is configured to: receive an image captured by an image sensor; determine that an image region in the image includes a representation of an object of a specified category; and adjust a hue of at least one pixel of the representation of the object in the image region to a specified hue to generate a processed image.

In another example, a non-transitory computer-readable medium is provided that has stored thereon instructions that, when executed by one or more processors, cause the one or more processors to: receive an image captured by an image sensor; determine that an image region in the image includes a representation of an object of a specified category; and adjust a hue of at least one pixel of the representation of the object in the image region to a specified hue to generate a processed image.

In another example, an apparatus for imaging is provided. The apparatus includes: means for receiving an image captured by an image sensor; means for determining that an image region in the image includes a representation of an object of a specified category; and means for adjusting a hue of at least one pixel of the representation of the object in the image region to a specified hue to generate a processed image.

In some aspects, the specified category is skin, wherein the object includes at least a portion of a person, and wherein the specified hue is associated with the skin. In some aspects, the portion of the person includes at least one of a face of the person or a hand of the person. In some aspects, the specified category is plant matter, wherein the object includes at least a portion of a plant, and wherein the specified hue is associated with the plant matter. In some aspects, the specified category is sky, wherein the object includes a region of the sky, and wherein the specified hue is associated with the sky.

In some aspects, one or more of the methods, apparatuses, and computer-readable medium described above further comprise: adjusting a brightness of at least one pixel of the representation of the object in the image region to generate the processed image. In some aspects, one or more of the methods, apparatuses, and computer-readable medium described above further comprise: adjusting a saturation of at least one pixel of the representation of the object in the image region to generate the processed image. In some aspects, one or more of the methods, apparatuses, and computer-readable medium described above further comprise: adjusting a tone of at least one pixel of the representation of the object in the image region to generate the processed image.

In some aspects, one or more of the methods, apparatuses, and computer-readable medium described above further comprise: calculating average hue, average saturation, and average brightness for a plurality of bins corresponding to different color ranges in the image; adjusting the hue based on the average hue to adjust the hue of the at least one pixel; adjusting a saturation of the image based on the average saturation to generate the processed image; and adjusting a brightness of the image based on the average brightness to generate the processed image.

In some aspects, one or more of the methods, apparatuses, and computer-readable medium described above further comprise: outputting the processed image. In some aspects, one or more of the methods, apparatuses, and computer-readable medium described above further comprise: causing display of the processed image using a display. In some aspects, one or more of the methods, apparatuses, and computer-readable medium described above further comprise: causing the processed image to be sent to a recipient device using a communication interface.

In some aspects, one or more of the methods, apparatuses, and computer-readable medium described above further comprise: performing a color phase correction on the at least one pixel of the representation of the object in the image region to adjust the hue of the at least one pixel of the representation of the object in the image region.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
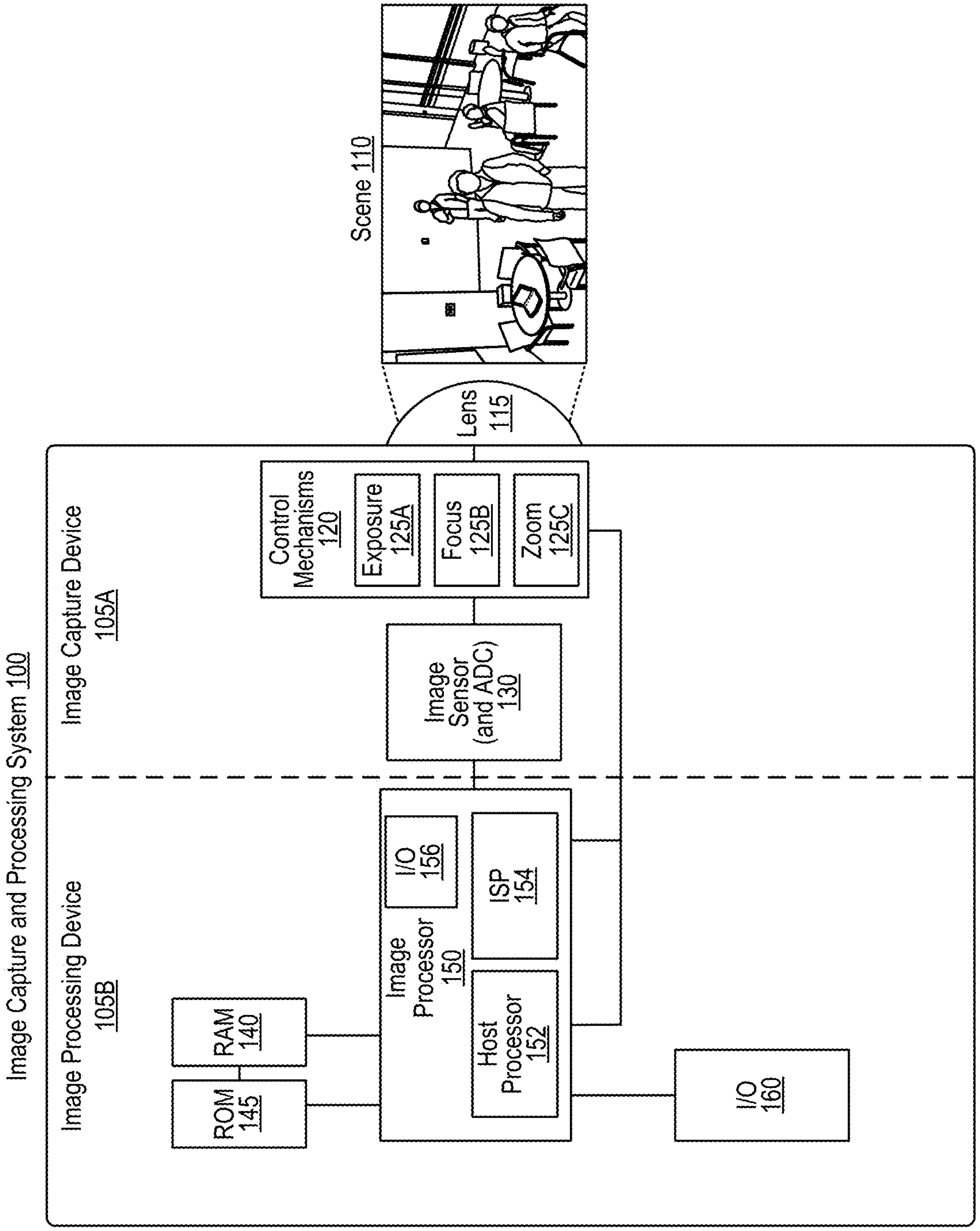
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

A device that includes a camera can analyze image data captured by an image sensor to detect, recognize, classify, and/or track an object within the image data. For instance, by detecting and/or recognizing an object in multiple video frames of a video, the device can track movement of the object over time.

In some examples, systems and techniques are described for image processing. In some examples, an imaging system receives an image captured by an image sensor. The imaging system determines that an image region in the image includes a representation (e.g., depiction) of an object of a specified category. The imaging system adjusts a hue (and/or saturation and/or brightness) of at least one pixel of the representation of the object in the image region to a specified hue (and/or saturation and/or brightness) to generate a processed image.

The imaging systems and techniques described herein provide a number of technical improvements over prior imaging systems, for instance processing images so that hues, tones, and or other characteristics of representations of certain types objects (e.g., skin, faces, hands, vegetation, sky, water, or other object types) are more accurate and true to their real-world appearances, more precise, and more consistent. The imaging systems and techniques described herein can also provide a useful input for calibrating image sensors and/or other sensors.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1410 discussed with respect to the computing system 1400. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1420, read-only memory (ROM) 145 and/or 1425, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1435, any other input devices 1445, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1402.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
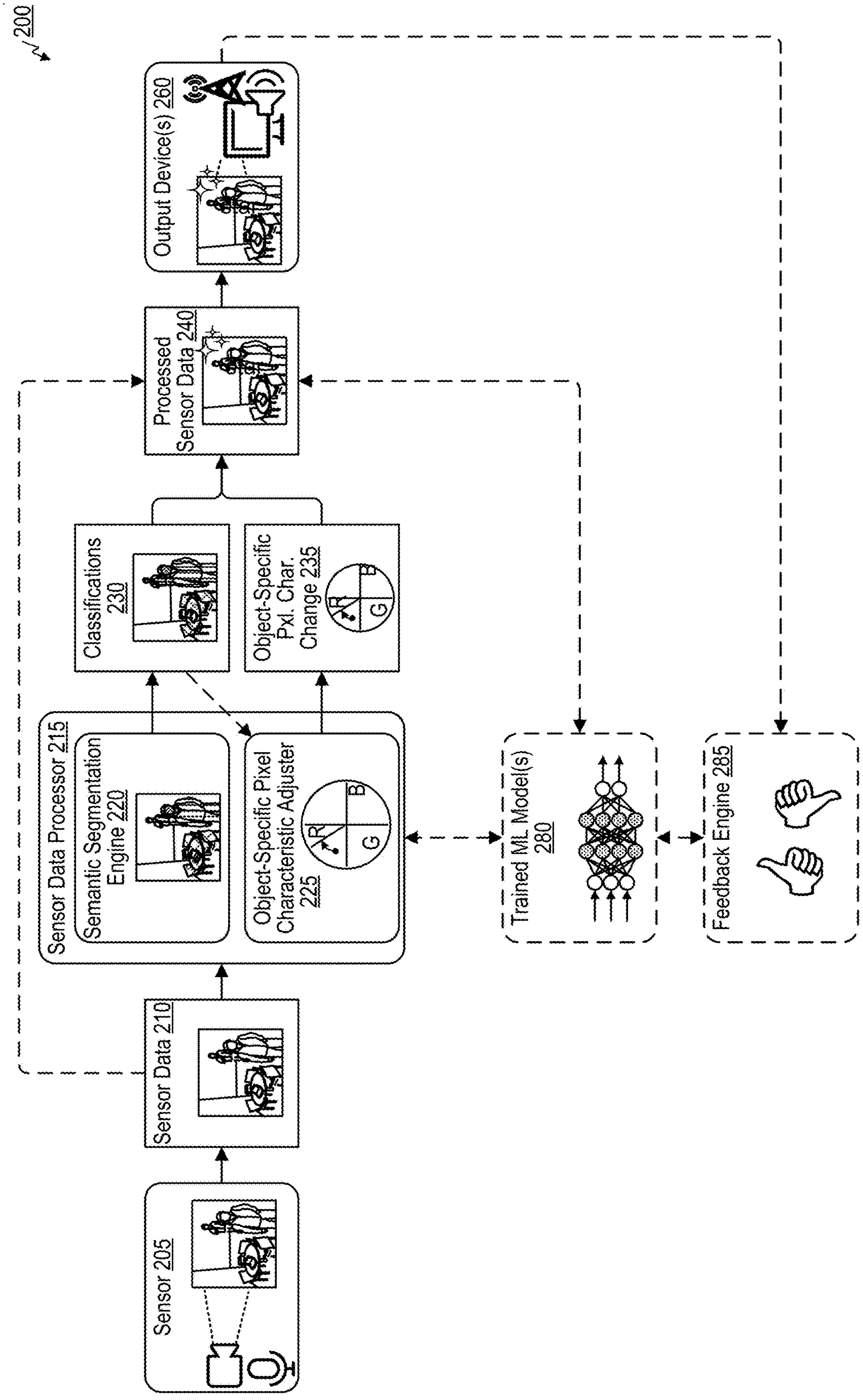
FIG. 2 is a block diagram illustrating an example architecture of a sensor data processing system that performs a process for semantic segmentation and pixel characteristic (e.g., hue, tone, brightness, color, saturation, etc.) modification, in accordance with some examples.

FIG. 2 is a block diagram illustrating an example architecture of a sensor data processing system 200 that performs a process for semantic segmentation and pixel characteristic (e.g., hue, tone, brightness, color, saturation, etc.) modification. The sensor data processing system 200 can include at least one of the image capture and processing system 100, the image capture device 105A, the image processing device 105B, the HMD 310, the mobile handset 410, an imaging system that performs the process 900, an imaging system that performs the process 900, the neural network 1200, an imaging system that performs the process 1300, the computing system 1400, the processor 1410, or a combination thereof. In some examples, the sensor data processing system 200 can include, for instance, one or more laptops, phones, tablet computers, mobile handsets, video game consoles, vehicle computers, desktop computers, wearable devices, televisions, media centers, extended reality (XR) systems, virtual reality (VR) systems, augmented reality (AR) systems, mixed reality (MR) systems, head-mounted display (HMD) devices, other types of computing devices discussed herein, or combinations thereof.

The sensor data processing system 200 includes at least one sensor 205 that captures sensor data 210. Examples of the sensor 205 include the image capture and processing system 100, the image capture device 105A, the image processing device 105B, the image sensor 130, image sensor (s) of any of cameras 330A-330D, image sensor(s) of any of cameras 430A-430D, an image sensor that captures an image that is used in the input layer 1210 of the NN 1200, the image sensor of the imaging process 1300, an image sensor of an input device 1445, or a combination thereof. In some examples, the sensor data 210 includes raw image data, image data, pixel data, image frame(s), raw video data, video data, video frame(s), or a combination thereof.

In some examples, the at least one sensor 205 can be, or can include, an image sensor with an array of photodetectors. The photodetectors of the image sensor can be sensitive to one or more subsets of the electromagnetic (EM) frequency domain, such as the radio EM frequency domain, the microwave EM frequency domain, the infrared (IR) EM frequency domain, the visible light (VL) EM frequency domain, the ultraviolet (UV) EM frequency domain, the X-Ray EM frequency domain, the gamma ray EM frequency domain, a subset of any of these, or a combination thereof. In some examples, different photodetectors of the image sensor can be configured to be sensitive to different EM frequency domains and/or different color channels. In some examples, the sensor 205 captures multiple image frames configured to be arranged in a sequence to form a video, and the sensor data 210 includes at least a subset of the video (e.g., at least one video frame of the video).

In some examples, the sensor 205 can be directed toward a user (e.g., can face toward the user), and can thus capture sensor data (e.g., image data) of (e.g., depicting or otherwise representing) at least portion(s) of the user. In some examples, the sensor 205 can be directed away from the user (e.g., can face away from the user) and/or toward an environment that the user is in, and can thus capture sensor data (e.g., image data) of (e.g., depicting or otherwise representing) at least portion(s) of the environment. In some examples, sensor data 210 captured by the sensor 205 is directed away from the user and/or toward the user. In some examples, sensor data 210 captured by the sensor 205 is can have a field of view (FoV) that includes, is included by, overlaps with, and/or otherwise corresponds to, a FoV of the eyes of the user.

In some examples, sensor 205 can be, or can include, other types of sensors other than image sensors. In some examples, the sensor data processing system 200 can also include one or more other sensors in addition to the sensor 205, such as one or more other image sensors and/or one or more other types of sensors. Sensor types can include, for instance, image sensors, cameras, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, other sensors discussed herein, or combinations thereof. In some examples, the one or more sensors 205 include at least one input device 1445 of the computing system 1400. In some implementations, one or more of these additional sensor(s) may complement or refine sensor readings from the sensor 205. For example, Inertial Measurement Units (IMUs), accelerometers, gyroscopes, or other sensors may be used to identify a pose (e.g., position and/or orientation) and/or motion(s) and/or acceleration(s) of the sensor data processing system 200 and/or of the user in the environment, which can be used by the sensor data processing system 200 to reduce motion blur, rotation blur, or combinations thereof.

A graphic representing the sensor 205 is illustrated in FIG. 2, and illustrates a sensor (e.g., an image sensor) capturing a representation (e.g., an image) of a scene with two people in an office. A graphic representing the sensor data 210 is illustrated in FIG. 2, and illustrates the representation (e.g., image) of the scene with the scene with two people in the office that is captured by the sensor 205.

The sensor data processing system 200 includes a sensor data processor 215. The sensor data processor 215 includes a semantic segmentation engine 220 and an object-specific pixel characteristic adjustor 225. In some examples, the sensor data processor 215 can include the image processing device 105B, the image processor 150, the host processor 152, the ISP 154, a processor of the HMD 310, a processor of the mobile handset 410, the neural network 1200, the computing system 1400, the processor 1410, or a combination thereof. The sensor data processor 215 (e.g., the semantic segmentation engine 220 and/or the object-specific pixel characteristic adjustor 225) receive the sensor data 210 from the sensor 205.

In response to receiving the sensor data 210 from the sensor 205, the semantic segmentation engine 220 identifies classifications 230 for different areas in the sensor data 210 that represent different types of objects, materials, and the like. For instance, the classifications 230 determined by the semantic segmentation engine 220 can identify a first region of the sensor data 210 that depicts or otherwise represents clothing (e.g., worn by a person in the sensor data 210), a second region of the sensor data 210 that depicts or otherwise represents skin (e.g., of a face or hand or other body part of a person in the sensor data 210), a third region of the sensor data 210 that depicts or otherwise represents hair (e.g., of a person in the sensor data 210), a fourth region of the sensor data 210 that depicts or otherwise represents the sky, a fifth region of the sensor data 210 that depicts or otherwise represents a wall, a sixth region of the sensor data 210 that depicts or otherwise represents vegetation (e.g., plant(s)), a seventh region of the sensor data 210 that depicts or otherwise represents water, an eighth region of the sensor data 210 that depicts or otherwise represents a floor, and the like.

To identify the classifications 230, the semantic segmentation engine 220 can perform detection, extraction, classification, recognition, and/or tracking of feature(s), object(s), person(s), face(s), hand(s), vehicle(s), animal(s), plant(s), structure(s), and/or combinations thereof. Classification can include determination of an object type of an object detected, recognized, and/or tracked by the semantic segmentation engine 220. In some examples, the semantic segmentation engine 220 can use one or more trained machine learning (ML) models 280 to identify the classifications 230, for instance by inputting the sensor data 210 into the trained ML model(s) 280. In some examples, the trained ML model(s) 280 can be trained to identify classifications (such as the classifications 230) by learning and/or training using training data that includes sensor data (e.g., image(s)) (e.g., as in the sensor data 210) along with pre-identified classifications (e.g., as in the classifications 230) for different region(s) and/or areas in the sensor data.

A graphic representing the semantic segmentation engine 220, and the classifications 230, is illustrated in FIG. 2, and illustrates the scene with two people in an office representing the sensor data 210, but with different types of objects shaded using different shading patterns to represent classification of those different object types. For instance, skin (of the faces and hands of the people) are shaded using a dark pattern of dense dots, clothing is shaded using a pattern of vertical stripes, a wood (of a table and chairs) are shaded using a cross-hatch pattern, and electronics (e.g., a laptop) are shaded using a pattern of diagonal stripes. Additional examples of the classifications 230 include the classifications 520 of FIG. 5.

In response to receiving the sensor data 210 from the sensor 205, and in some cases the classifications 230 from the semantic segmentation engine 220, the object-specific pixel characteristic adjuster 225 identifies at least one object-specific pixel characteristic change 235 to make to at least one area in the sensor data to generate the processed sensor data 240. The object-specific pixel characteristic adjuster 225 can identify the object-specific pixel characteristic change 235 to a specific object and/or specific object type in the sensor data 210. The specific object and/or the specific object type can be previously identified in the classifications 230 using the semantic segmentation engine 220. The object-specific pixel characteristic adjuster 225 can identify the object-specific pixel characteristic change 235 to one or more pixel characteristics such as hue, tone, brightness, saturation, contrast, sharpness, denoising, luma, another image characteristic or pixel characteristic discussed herein, or a combination thereof.

The object-specific pixel characteristic adjuster 225 can identify the object-specific pixel characteristic change 235 from a measured or observed value in the sensor data 210 to a target value or an expected value to be used in the processed sensor data 240. For instance, in some examples, the object-specific pixel characteristic adjuster 225 can identify the object-specific pixel characteristic change 235 to be a change in a skin hue or skin tone from a measured or observed skin hue or skin tone to a target skin hue or skin tone, or an expected skin hue or skin tone. For instance, a graphic representing the object-specific pixel characteristic adjuster 225, and the object-specific pixel characteristic change 235, is illustrated in FIG. 2, and illustrates a color circle in a particular color space, with red represented by "R," green represented by "G," and blue represented by "B." The color space may be, for instance, the hue-saturation-value (HSV) space, hue-saturation-lightness (HSL) space, the luma-blue-projection-red-projection (YUB) (YCbCr) space, the luma-in-phase-quadrature (YIQ) space, a color space associated with a vectorscope tool, or a combination thereof. Vertical and horizontal axes are illustrated in the color circle. A diagonal line is illustrated in the color circle in the upper-left quadrant, near the red color ("R"). This diagonal line can be referred to as a skin tone line, a skin hue line, a skin chroma line, a flesh tone line, a flesh hue line, a flesh chroma line, and/or the in-phase (I) line. The skin tone line may represent a line along which all human skin tones (at least on average) are expected to fall along. This diagonal line can be approximately 33 degrees to the left of the top of the vertical axis and/or approximately 123 degrees up from the right-hand side of the horizontal axis. A black dot is illustrated in the color circle, representing a measured and/or observed skin hue, skin tone, and/or skin chroma value from the sensor data 210. An arrow pointing from the black dot to the skin tone line represents an identified object-specific pixel characteristic change 235 that changes the measured and/or observed skin hue, skin tone, skin brightness, skin saturation, and/or skin chroma value from the sensor data 210 to a target and/or expected skin hue, skin tone, skin brightness, skin saturation, and/or skin chroma value on the skin tone line. The skin tone line may be an example of a range of skin hues, skin tones, skin brightness values, skin saturation values, and/or skin chroma values.

While the example provided above for the object-specific pixel characteristic change 235 is for changing a measured and/or observed hue, tone, brightness, saturation, color, and/or chroma value for skin to a corresponding target and/or expected value for skin, the same process may be used for other objects or types of objects. For instance, the object-specific pixel characteristic change 235 is for changing a measured and/or observed hue, tone, color, and/or chroma value for an object type to a corresponding target and/or expected value for the object type, where the object type is skin, hair, clothes, sky, plant(s), water, concrete, asphalt, metal, and/or other objects and/or object types discussed herein.

The sensor data processor 215, the semantic segmentation engine 220, and/or the object-specific pixel characteristic adjuster 225 can process the sensor data 210 to generate processed sensor data 240, for instance by applying the object-specific pixel characteristic change 235 to pixel(s) in a region of the sensor data 210 that is classified as representing a specific object or object type according to the classifications 230. A graphic representing the processed sensor data 240 is illustrated in FIG. 2, and illustrates the representation (e.g., image) of the scene with the scene with two people in the office of the sensor data 210 with a sparkle graphic added to represent the application of the object-specific pixel characteristic change 235 to an area determined according to the classifications 230.

The sensor data processing system 200 includes output device(s) 260. The output device(s) 260 can include one or more visual output devices, such as display(s) or connector(s) therefor. The output device(s) 260 can include one or more audio output devices, such as speaker(s), headphone(s), and/or connector(s) therefor. The output device(s) 260 can include one or more of the output device 1435 and/or of the communication interface 1440 of the computing system 1400. In some examples, the sensor data processing system 200 causes the display(s) of the output device(s) 260 to display the processed sensor data 240.

In some examples, the output device(s) 260 include one or more transceivers. The transceiver(s) can include wired transmitters, receivers, transceivers, or combinations thereof. The transceiver(s) can include wireless transmitters, receivers, transceivers, or combinations thereof. The transceiver(s) can include one or more of the output device 1435 and/or of the communication interface 1440 of the computing system 1400. In some examples, the sensor data processing system 200 causes the transceiver(s) to send, to a recipient device, the processed sensor data 240. In some examples, the recipient device can include another sensor data processing system 200, an HMD 310, a mobile handset 410, a computing system 1400, or a combination thereof. In some examples, the recipient device can include a display, and the data sent to the recipient device from the transceiver(s) of the output device(s) 260 can cause the display of the recipient device to display the processed sensor data 240.

In some examples, the display(s) of the output device(s) 260 of the sensor data processing system 200 function as optical "see-through" display(s) that allow light from the real-world environment (scene) around the sensor data processing system 200 to traverse (e.g., pass) through the display(s) of the output device(s) 260 to reach one or both eyes of the user. For example, the display(s) of the output device(s) 260 can be at least partially transparent, translucent, light-permissive, light-transmissive, or a combination thereof. In an illustrative example, the display(s) of the output device(s) 260 includes a transparent, translucent, and/or light-transmissive lens and a projector. The display(s) of the output device(s) 260 of can include a projector that projects virtual content (e.g., the processed sensor data 240) onto the lens. The lens may be, for example, a lens of a pair of glasses, a lens of a goggle, a contact lens, a lens of a head-mounted display (HMD) device, or a combination thereof. Light from the real-world environment passes through the lens and reaches one or both eyes of the user. The projector can project virtual content (e.g., the processed sensor data 240) onto the lens, causing the virtual content to appear to be overlaid over the user's view of the environment from the perspective of one or both of the user's eyes. In some examples, the projector can project the virtual content onto the onto one or both retinas of one or both eyes of the user rather than onto a lens, which may be referred to as a virtual retinal display (VRD), a retinal scan display (RSD), or a retinal projector (RP) display.

In some examples, the display(s) of the output device(s) 260 of the sensor data processing system 200 are digital "pass-through" display that allow the user of the sensor data processing system 200 and/or a recipient device to see a view of an environment by displaying the view of the environment on the display(s) of the output device(s) 260. The view of the environment that is displayed on the digital pass-through display can be a view of the real-world environment around the sensor data processing system 200, for example based on sensor data (e.g., images, videos, depth images, point clouds, other depth data, or combinations thereof) captured by the sensor 205 (e.g., sensor data 210) and/or other sensors described herein. The view of the environment that is displayed on the digital pass-through display can be a virtual environment (e.g., as in VR), which may in some cases include elements that are based on the real-world environment (e.g., boundaries of a room). The view of the environment that is displayed on the digital pass-through display can be an augmented environment (e.g., as in AR) that is based on the real-world environment. The view of the environment that is displayed on the digital pass-through display can be a mixed environment (e.g., as in MR) that is based on the real-world environment. The view of the environment that is displayed on the digital pass-through display can include virtual content (e.g., processed sensor data 240) overlaid over other otherwise incorporated into the view of the environment.

Within FIG. 2, a graphic representing the output device(s) 260 illustrates a display, a speaker, and a wireless transceiver, outputting the graphic representing the rendered image 270.

The trained ML model(s) 280 can include one or more neural network (NNs) (e.g., neural network 1200), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or combinations thereof. Within FIG. 2, a graphic representing the trained ML model(s) 280 illustrates a set of circles connected to another. Each of the circles can represent a node (e.g., node 1216), a neuron, a perceptron, a layer, a portion thereof, or a combination thereof. The circles are arranged in columns. The leftmost column of white circles represent an input layer (e.g., input layer 1210). The rightmost column of white circles represent an output layer (e.g., output layer 1214). Two columns of shaded circled between the leftmost column of white circles and the rightmost column of white circles each represent hidden layers (e.g., hidden layers 1212A-1212N).

In some examples, the sensor data processing system 200 includes a feedback engine 285 of the sensor data processing system 200. In some examples, the trained ML model(s) 280 and/or the feedback engine 285 are part of the sensor data processor 215, or are coupled to the sensor data processor 215. The feedback engine 285 can detect feedback received from a user interface of the sensor data processing system 200. The feedback may include feedback on output(s) of the various subsystems of the sensor data processing system 200 (e.g., the sensor data processor 215, the semantic segmentation engine 220, the object-specific pixel characteristic adjuster 225, the output device(s) 260, and/or the trained ML model(s) 280), such as the object detection, recognition, classification, and/or tracking. The feedback engine 285 can detect feedback about one engine of the sensor data processing system 200 received from another engine of the sensor data processing system 200, for instance whether one engine decides to use data from the other engine or not, and/or whether or not the use of that data is successful. The feedback received by the feedback engine 285 can be positive feedback or negative feedback. For instance, if the one engine of the sensor data processing system 200 uses data from another engine of the sensor data processing system 200 successfully, or if positive feedback from a user is received through a user interface, the feedback engine 285 can interpret this as positive feedback. If the one engine of the sensor data processing system 200 declines to data from another engine of the sensor data processing system 200, or is unable to successfully use the data from the other engine, or if negative feedback from a user is received through a user interface, the feedback engine 285 can interpret this as negative feedback. In an illustrative example, the feedback engine 285 can detect whether the sensor data processor 215 (e.g., the object-specific pixel characteristic adjuster 225) is able to successfully apply the object-specific pixel characteristic change 235 to an area of the sensor data 210 indicated by the classifications 230 to generate the processed sensor data 240. If so, the sensor data processor 215 effectively gives positive feedback to the semantic segmentation engine 220 and/or the object-specific pixel characteristic adjuster 225 (and any associated trained ML model(s) 280). If not, the sensor data processor 215 effectively gives negative feedback to the semantic segmentation engine 220 and/or the object-specific pixel characteristic adjuster 225 (and any associated trained ML model(s) 280).

Positive feedback can also be based on attributes of a user as detected in the sensor data 210 from the sensor(s) 205, such as the user smiling, laughing, nodding, saying a positive statement (e.g., “yes,” “confirmed,” “okay,” “next”), or otherwise positively reacting to an output of one of the engines described herein, or an indication thereof. Negative feedback can also be based on attributes of a user as detected in the sensor data from the sensor(s) 205, such as the user frowning, crying, shaking their head (e.g., in a “no” motion), saying a negative statement (e.g., “no,” “negative,” “bad,” “not this”), or otherwise negatively reacting to an output of one of the engines described herein, or an indication thereof.

In some examples, the feedback engine 285 provides the feedback to the trained ML model(s) 280 and/or to one or more subsystems of the sensor data processing system 200 that can use the trained ML model(s) 280 (e.g., the sensor data processor 215, the semantic segmentation engine 220, the object-specific pixel characteristic adjuster 225, and/or the output device(s) 260) as training data to update the one or more trained ML model(s) 280 of the sensor data processing system 200. For instance, the feedback engine 285 can provide the feedback as training data to the ML system(s) and/or the trained ML model(s) 280 to update the training for the sensor data processor 215, the semantic segmentation engine 220, the object-specific pixel characteristic adjuster 225, the output device(s) 260, the trained ML model(s) 280, or a combination thereof. Positive feedback can be used to strengthen and/or reinforce weights associated with the outputs of the ML system(s) and/or the trained ML model(s) 280, and/or to weaken or remove other weights other than those associated with the outputs of the ML system(s) and/or the trained ML model(s) 280. Negative feedback can be used to weaken and/or remove weights associated with the outputs of the ML system(s) and/or the trained ML model(s) 280, and/or to strengthen and/or reinforce other weights other than those associated with the outputs of the ML system(s) and/or the trained ML model(s) 280.

In some examples, certain elements of the sensor data processing system 200 (e.g., the sensor 205, the sensor data processor 215, the semantic segmentation engine 220, the object-specific pixel characteristic adjuster 225, the output device(s) 260, the image renderer 265, the trained ML model(s) 280, the feedback engine 285, or a combination thereof) include a software element, such as a set of instructions corresponding to a program, that is run on a processor such as the processor 1410 of the computing system 1400, the image processor 150, the host processor 152, the ISP 154, the sensor data processor 215, or a combination thereof. In some examples, one or more of these elements of the sensor data processing system 200 can include one or more hardware elements, such as a specialized processor (e.g., the processor 1410 of the computing system 1400, the image processor 150, the host processor 152, the ISP 154, the sensor data processor 215, or a combination thereof). In some examples, one or more of these elements of the sensor data processing system 200 can include a combination of one or more software elements and one or more hardware elements.

Figure 3A:
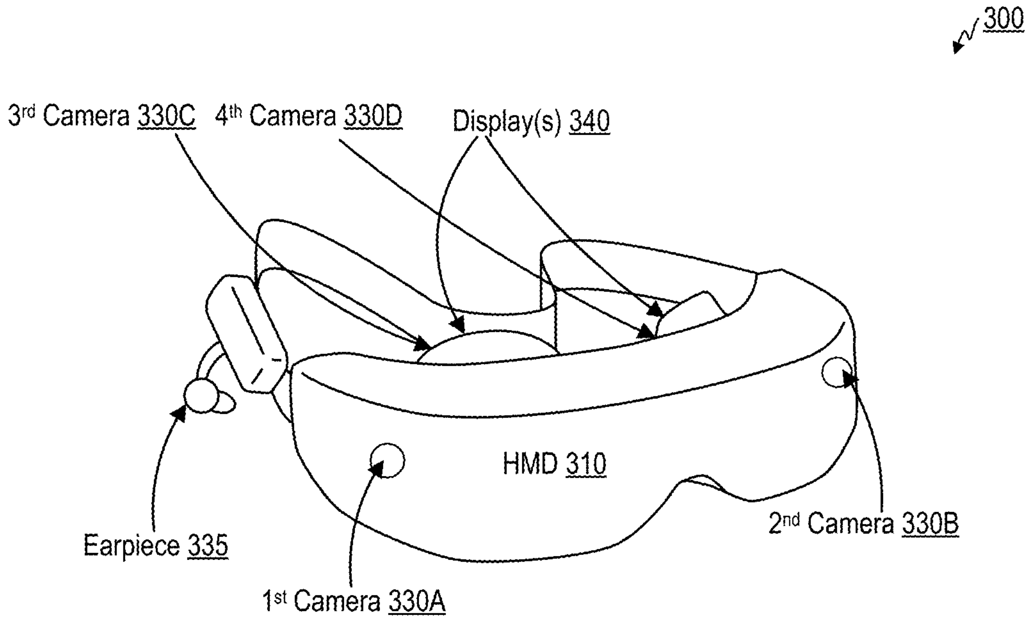
FIG. 3A is a perspective diagram illustrating a head-mounted display (HMD) that is used as part of an imaging system, in accordance with some examples.

FIG. 3A is a perspective diagram 300 illustrating a head-mounted display (HMD) 310 that is used as part of a sensor data processing system 200. The HMD 310 may be, for example, an augmented reality (AR) headset, a virtual reality (VR) headset, a mixed reality (MR) headset, an extended reality (XR) headset, or some combination thereof. The HMD 310 may be an example of a sensor data processing system 200. The HMD 310 includes a first camera 330A and a second camera 330B along a front portion of the HMD 310. The first camera 330A and the second camera 330B may be examples of the sensor 205 of the sensor data processing system 200. The HMD 310 includes a third camera 330C and a fourth camera 330D facing the eye(s) of the user as the eye(s) of the user face the display(s) 340. The third camera 330C and the fourth camera 330D may be examples of the sensor 205 of the sensor data processing system 200. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D, which may also include other types of sensor 205 of the sensor data processing system 200. In some examples, the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on the user 320's head. The one or more displays 340 of the HMD 310 can be examples of the one or more displays of the output device(s) 260 of the sensor data processing system 200. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays.

Figure 3B:
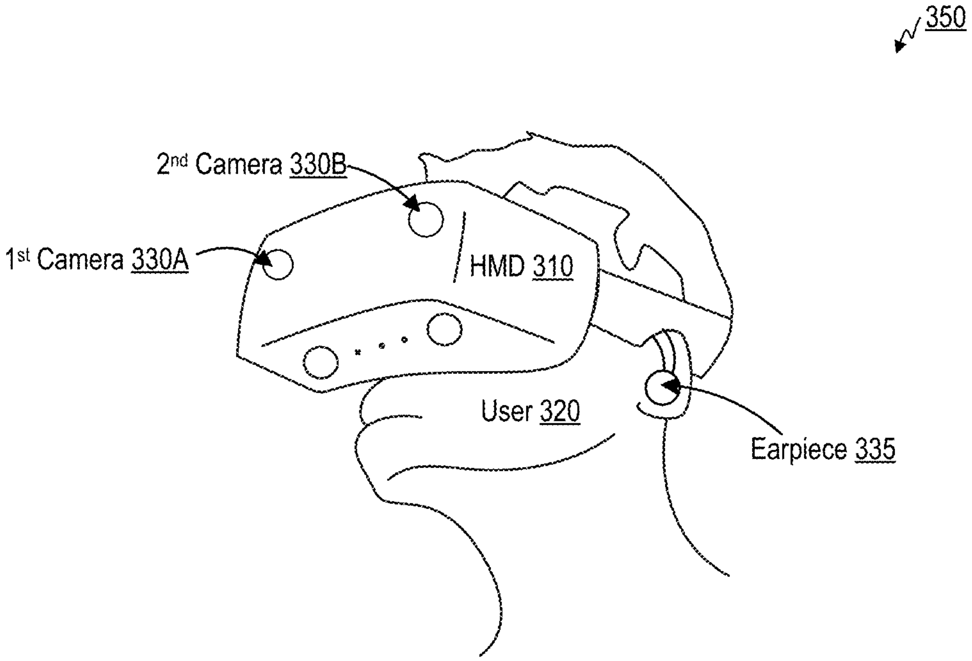
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310, and may be examples of output device(s) 260. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include the processed sensor data 240. The output images can be based on the images captured by the first camera 330A and the second camera 330B (e.g., the sensor data 210), for example with the processed content (e.g., the processed sensor data 240) overlaid. The output images may provide a stereoscopic view of the environment, in some cases with the processed content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid processed content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the processed content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
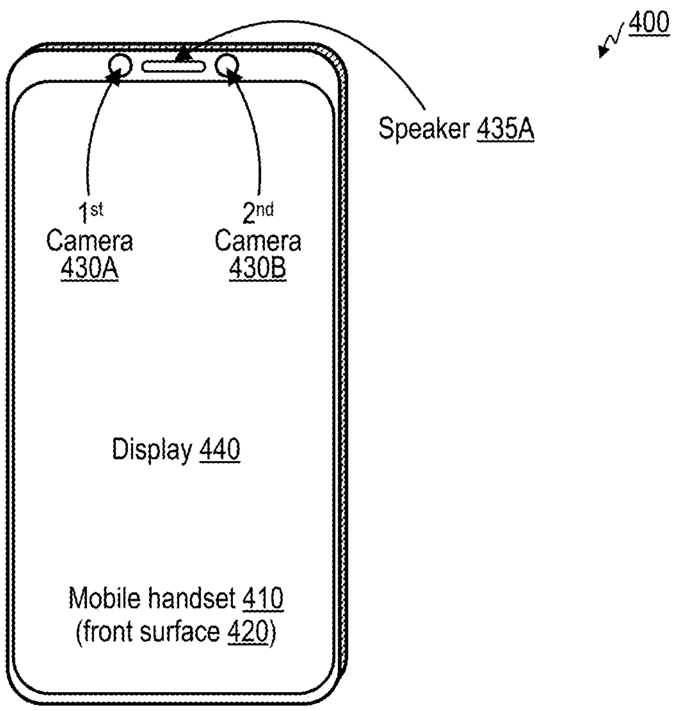
FIG. 4A is a perspective diagram illustrating a front surface of a mobile handset that includes front-facing cameras and that can be used as part of an imaging system, in accordance with some examples.

FIG. 4A is a perspective diagram 400 illustrating a front surface of a mobile handset 410 that includes front-facing cameras and can be used as part of a sensor data processing system 200. The mobile handset 410 may be an example of a sensor data processing system 200. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the sensor 205 of the sensor data processing system 200. The first camera 430A and the second camera 430B can face the user, including the eye(s) of the user, while content (e.g., the processed sensor data 240) is displayed on the display 440. The display 440 may be an example of the display(s) of the output device(s) 260 of the sensor data processing system 200.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. In some examples, the front surface 420 of the mobile handset 410 may only have a single camera.

In some examples, the display 440 of the mobile handset 410 displays one or more output images toward the user using the mobile handset 410. In some examples, the output images can include the processed sensor data 240. The output images can be based on the images (e.g., the sensor data 210) captured by the first camera 430A, the second camera 430B, the third camera 430C, and/or the fourth camera 430D, for example with the processed content (e.g., the processed sensor data 240) overlaid.

In some examples, the front surface 420 of the mobile handset 410 may include one or more additional cameras in addition to the first camera 430A and the second camera 430B. The one or more additional cameras may also be examples of the sensor 205 of the sensor data processing system 200. In some examples, the front surface 420 of the mobile handset 410 may include one or more additional sensors in addition to the first camera 430A and the second camera 430B. The one or more additional sensors may also be examples of the sensor 205 of the sensor data processing system 200. In some cases, the front surface 420 of the mobile handset 410 includes more than one display 440. The one or more displays 440 of the front surface 420 of the mobile handset 410 can be examples of the display(s) of the output device(s) 260 of the sensor data processing system 200. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the front surface 420 of the mobile handset 410, with these microphones being examples of the sensor 205 of the sensor data processing system 200. In some examples, the audio output by the mobile handset 410 to the user through the one or more speakers 435A and/or other audio output devices may include, or be based on, audio recorded using the one or more microphones.

Figure 4B:
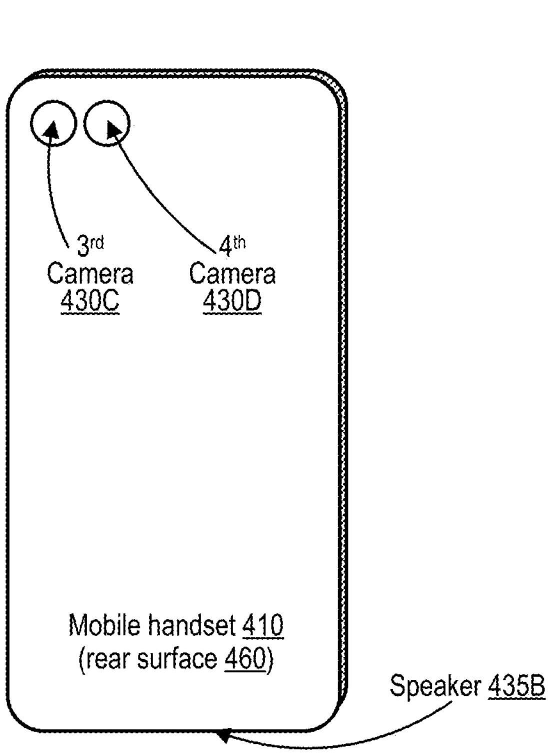
FIG. 4B is a perspective diagram illustrating a rear surface of a mobile handset that includes rear-facing cameras and that can be used as part of an imaging system, in accordance with some examples.

FIG. 4B is a perspective diagram 450 illustrating a rear surface 460 of a mobile handset that includes rear-facing cameras and that can be used as part of a sensor data processing system 200. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the sensor 205 of the sensor data processing system 200. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the sensor 205 of the sensor data processing system 200. In some examples, the rear surface 460 of the mobile handset 410 may include one or more additional sensors in addition to the third camera 430C and the fourth camera 430D. The one or more additional sensors may also be examples of the sensor 205 of the sensor data processing system 200. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the rear surface 460 of the mobile handset 410, with these microphones being examples of the sensor 205 of the sensor data processing system 200. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images, such as the processed sensor data 240. The output images can be based on the images (e.g. the sensor data 210) captured by the third camera 430C and/or the fourth camera 430D, for example with the processed content (e.g., the processed sensor data 240) overlaid. The first camera 430A and/or the second camera 430B can capture images of the user's eyes (and/or other portions of the user) before, during, and/or after the display of the output images with the processed content on the display 440. This way, the sensor data from the first camera 430A and/or the second camera 430B can capture reactions to the processed content by the user's eyes (and/or other portions of the user).

Figure 5:
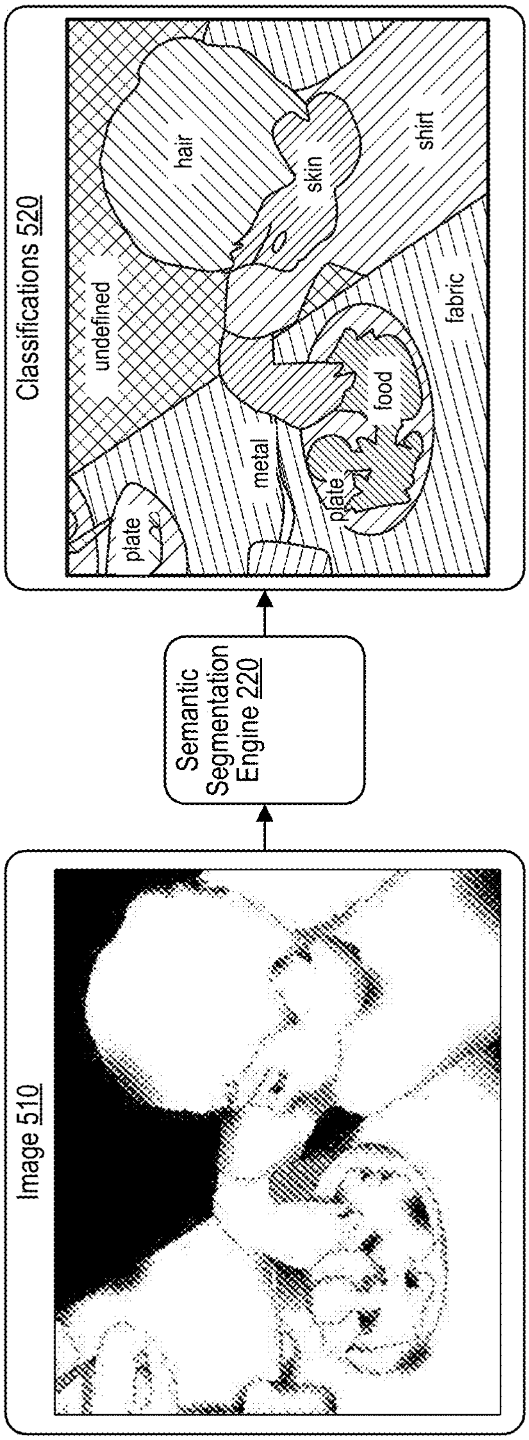
FIG. 5 is a conceptual diagram illustrating classifications of portions of an image using a semantic segmentation engine, in accordance with some examples.

FIG. 5 is a conceptual diagram 500 illustrating classifications 520 of portions of an image 510 using a semantic segmentation engine 220. The image 510 illustrates a boy picking at food on a plate with his hands. The image 510 is an example of the sensor data 210. The image 510 is input into the semantic segmentation engine 220, which generates the classifications 520 based on the object types depicted in different areas of the image 510. The classifications 520 are illustrated as different patterns representing different categories of object, with different patterns representing categories such as skin, hair, shirt, fabric, food, plate, metal, and undefined, respectively.

Figure 6:
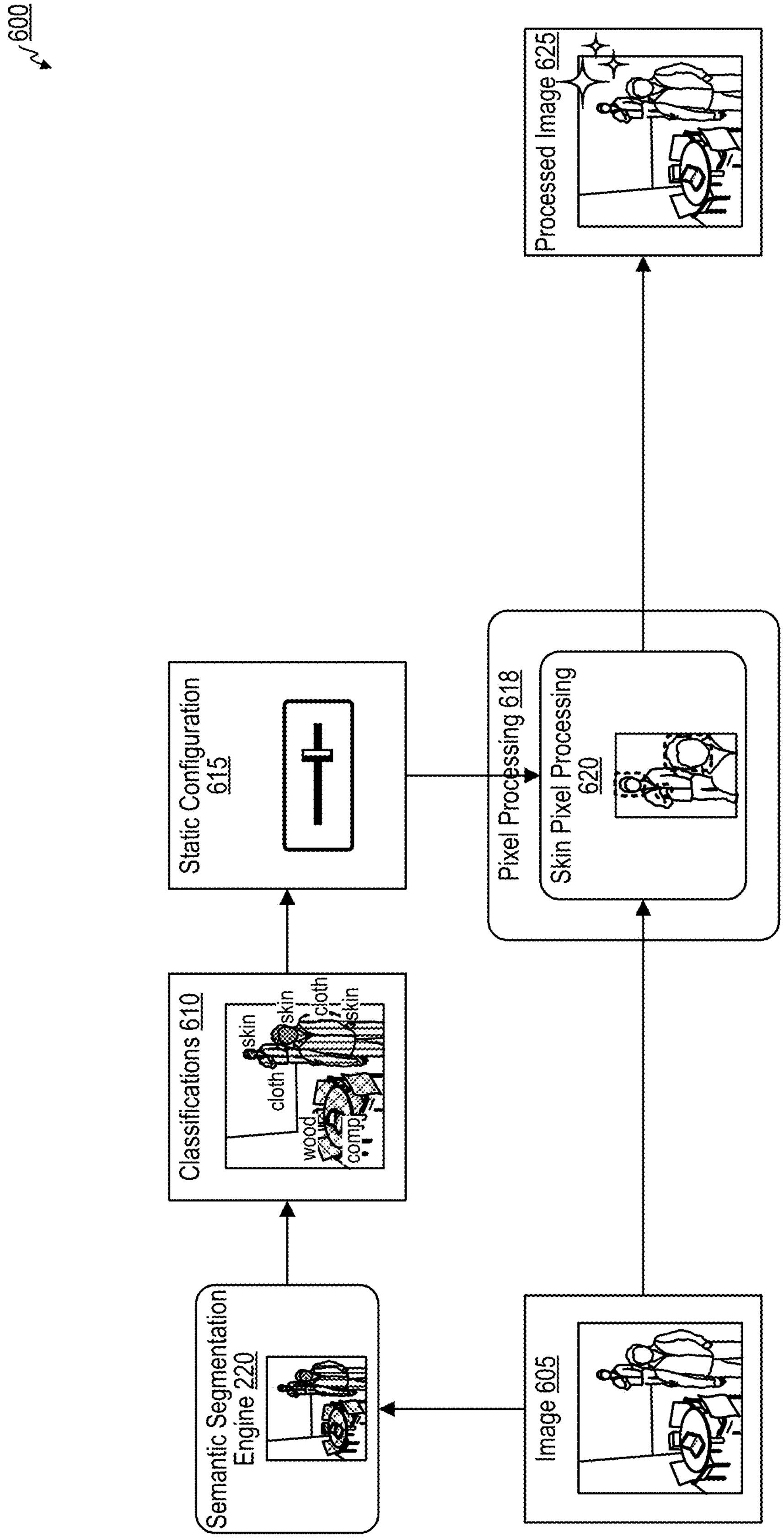
FIG. 6 is a block diagram illustrating a process for skin pixel processing using a static configuration, in accordance with some examples.

FIG. 6 is a block diagram illustrating a process 600 for skin pixel processing using a static configuration. In the process 600, an image 605 is received (e.g., from a sensor 205) and provided to a semantic segmentation engine 220 to generate classifications 610. The image 605 is an example of the sensor data 210. The classifications 610 are an example of the classifications 230, based specifically on the image 605.

Under the process 600 an image processor applies a static configuration 615 for skin pixel processing 620 to regions of the image 605 that depict skin (according to the classifications 610) to generate a processed image 625. For instance, the static configuration 615 can indicate that all areas of the image 605 that depict skin (per the classifications 610) are to have brightness adjusted (e.g., increased or decreased) by a specified offset amount and/or multiplier amount, are to have contrast adjusted (e.g., increased or decreased) by a specified offset amount and/or multiplier amount, are to have saturation adjusted (e.g., increased or decreased) by a specified offset amount and/or multiplier amount, are to have hue shifted (e.g., warmer or colder) by a specified offset amount and/or multiplier amount, or a combination thereof. The skin pixel processing 620 may be part of pixel processing 618 more generally, for processing the pixels of the image 605. In some examples, the static configuration 615 refers to a configuration that also applies to other aspects of the pixel processing 618 more generally, not just to skin pixel processing 620. In some examples, the static configuration 615 refers to a configuration that only applies to skin pixel processing 620, while other aspects of the pixel processing 618 are handled separately with a different static or dynamic configuration.

In some examples, a traditional camera can fail to render a correct tone (e.g., hue, brightness, color, and/or saturation) for one or more types of objects (e.g., skin, sky, vegetation, water, etc.). The human eye is sensitive to inaccurate colors of known objects or materials, such as those listed above, making images with incorrect tones appear noticeably unnatural or incorrect to the human eye (e.g., making the image appear to have low image quality).

Making adjustments to pixel data for objects without understanding correct target tones or expected tones, for instance using the static configuration 615 of the process 600, can result in processed images with visual artifacts, incorrect tone/color/hue, or images that look "over-processed" because colors and/or saturation appear unnatural. Understanding the scene semantics (e.g., using the semantic segmentation engine 220 to generate the classifications 610) and setting static tuning for different objects can be insufficient to provide accurate skin tones (e.g., hue, tone, color, saturation, brightness, etc.) and/or tones for other object types. For instance, in some cases the object is already saturated/bright or dark, and a static configuration may force additional processing for the object (e.g., to add saturation to the sky or brightness to a person) when there is no need to do so, and/or when the additional processing actually makes the object appear less accurate. Furthermore, a static configuration 615 as in the process 600 can cause issues under certain lighting conditions, for instance where the scene lit by several light sources, where light is reflected from the object being processed (e.g., skin), or where colorful light is reflected from colorful object (e.g., umbrella, wall, etc.) onto the object being processed (e.g., skin).

Figure 7:
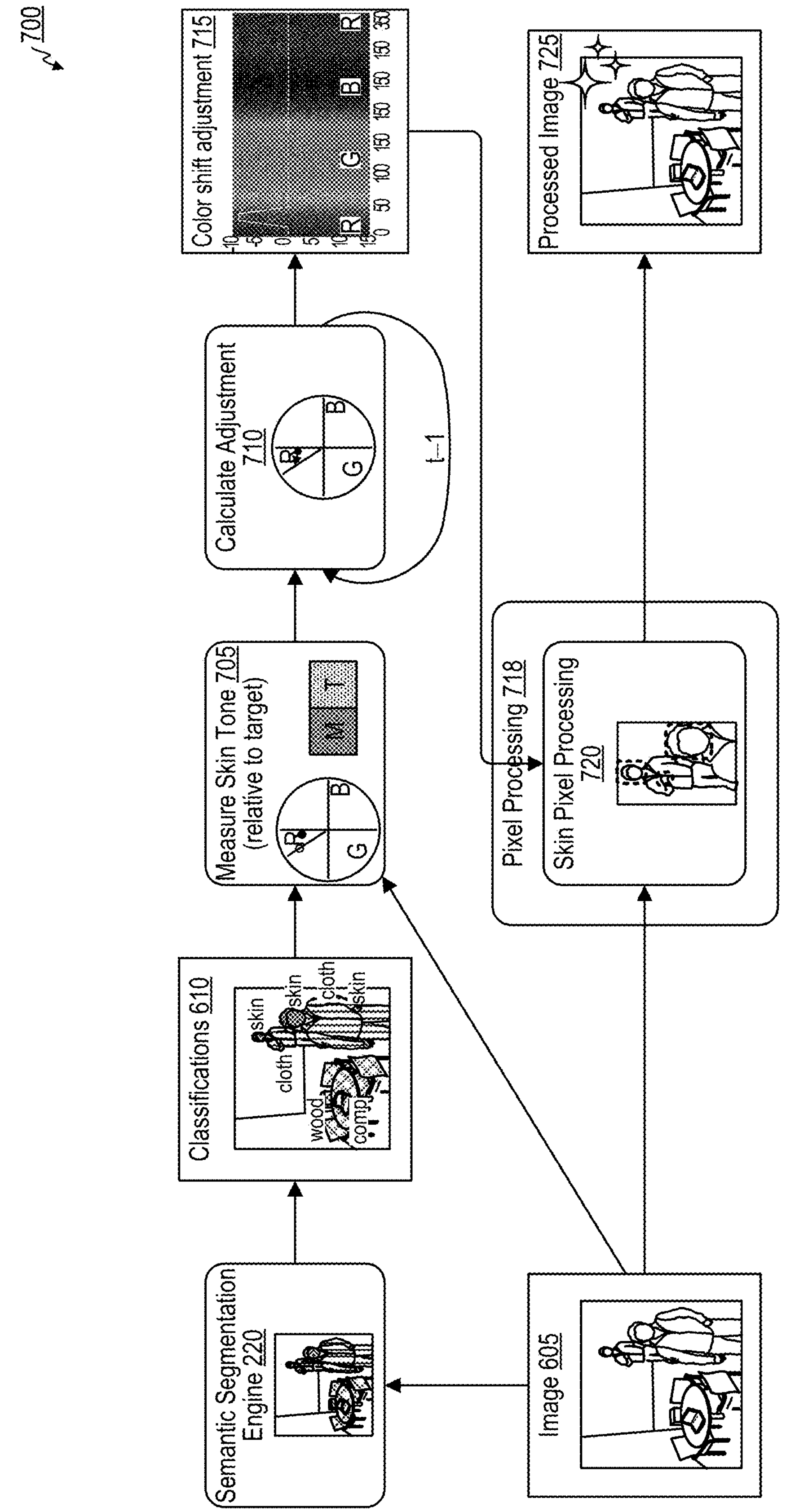
FIG. 7 is a block diagram illustrating a process for skin pixel processing using a dynamic configuration, in accordance with some examples.

FIG. 7 is a block diagram illustrating a process 700 for skin pixel processing 720 using a dynamic configuration. The process 700 retains the image 605, the semantic segmentation engine 220, and the classifications 610 of the process 600 of FIG. 6, but features a dynamic configuration in place of the static configuration 615 of the process 600 of FIG. 6.

In the dynamic configuration, the process 700 (e.g., the object-specific pixel characteristic adjuster 225) measures the skin tone 705 in the image 605. The measured skin tone can include one or more absolute values or one or more relative values (e.g., relative to a target skin tone). An example measured skin tone that appears too red (e.g., too warm) is illustrated labeled with the letter "M," alongside an example target skin tone that is less red (e.g., colder) that is illustrated labeled with the letter "T." A color circle is also illustrated, with the measured skin tone labeled using a black dot and the target skin tone labeled as a white dot along the skin tone line. In some examples, measuring the skin tone can include measuring various statistics, such as averages for hue, saturation, and/or value (e.g., value referring to an indicator of lightness, brightness, and/or luma) as indicated in the statistics indicated under the graphed statistics 910 or the calculated statistics 915. The process 700 (e.g., the object-specific pixel characteristic adjuster 225) calculates an adjustment 710 to the skin tone to produce a color shift adjustment 715. The color shift adjustment 715 indicates that a change of +5 is to be made at and around a red-orange hue representing skin hue, gradually tapering off to shifting less and less, and ultimately shifting zero (no color shift) for most other colors (e.g., yellow, green, cyan, blue, indigo, violet). The process 700 (e.g., the object-specific pixel characteristic adjuster 225) can calculate adjustments 710 to the skin tone with improvements to temporal consistency and/or stability, for instance provided using a infinite impulse response (IIR) filter and/or a direction confidence algorithm (indicated by the looped arrow with the t−1 indicator) to avoid fluctuations. In some examples, the calculation of adjustments 710 to the skin tone, and/or other operations discussed herein, can be repeated in the process 700 per object, per person, per region of the image 605 that depicts skin, per pixel, per block, or a combination thereof.

The process 700 (e.g., the sensor data processor 215 and/or the object-specific pixel characteristic adjuster 225) performs skin pixel processing 720 on the image 605 to generate the processed image 725 by applying the color shift adjustments 715 to the regions identified using the classifications 610 based on the color shifts identified in the color shift adjustment 715. The color shift adjustment 715 is illustrated as a trapezoidal shift in spanning red and orange (e.g., at and near skin tone colors), and adjacent frequencies, peaking at a color shift of 5 and gradually dropping to a color shift of 0. Other colors, such as green and blue, have a color shift of 0. In some examples, rather than a trapezoidal color shift function, another gradual function can be used to gradually taper off color shifting around the edges of the skin tone color span. The color shift adjustment 715 is illustrated in FIG. 7 graphed along a plane with a horizontal axis representing visible light hues or frequencies (and thus colors) and a vertical axis representing output offset (in terms of degrees in a color wheel as in FIG. 8). The plane includes representations of a spectrum of different colors along the horizontal axis as well, with portions of the spectrum representing red marked with an "R," portion(s) of the spectrum representing green marked with a "G," and portion(s) of the spectrum representing blue marked with a "B."

The process 700 understands the skin tone in the scene and guides the sensor data processor 215 (e.g., the ISP 154) to adjust skin tone areas (only) via the skin pixel processing 720 to the correct skin tone to match a target skin tone that is defined mathematically, for instance representing the closest point on, along, and/or tangential to the skin tone line. The measurement of the skin tone 705 and the calculation of the adjustment 710 can be performed on a per-pixel basis, providing a dynamic color shift adjustment 715 that can also apply with different strengths to different colors, tones, and/or hues. The skin pixel processing 720 may be part of pixel processing 718 more generally, for processing the pixels of the image 605. In some examples, the dynamic configuration discussed above refers to a configuration that also applies to other aspects of the pixel processing 718 more generally, not just to skin pixel processing 720. In some examples, the dynamic configuration discussed above refers to a configuration that only applies to skin pixel processing 720, while other aspects of the pixel processing 718 are handled separately with a different static or dynamic configuration.

While the process 700 is illustrated for skin tone adjustment, it should be understood that it can be applied to adjust hues, tones, colors, brightness values, luma values, and/or other pixel characteristics for other types of objects, such as hair, clothes, sky, plant(s), water, concrete, asphalt, metal, and/or other objects and/or object types discussed herein. In some examples, the image 605 may be a video frame of a video. Where the sensor data 210 includes video (e.g., with the image 605 as a video frame), the process 700 may also apply one or more temporal stability mechanisms, such as an infinite impulse response (IIR) filter and/or a direction confidence algorithm.

Figure 8:
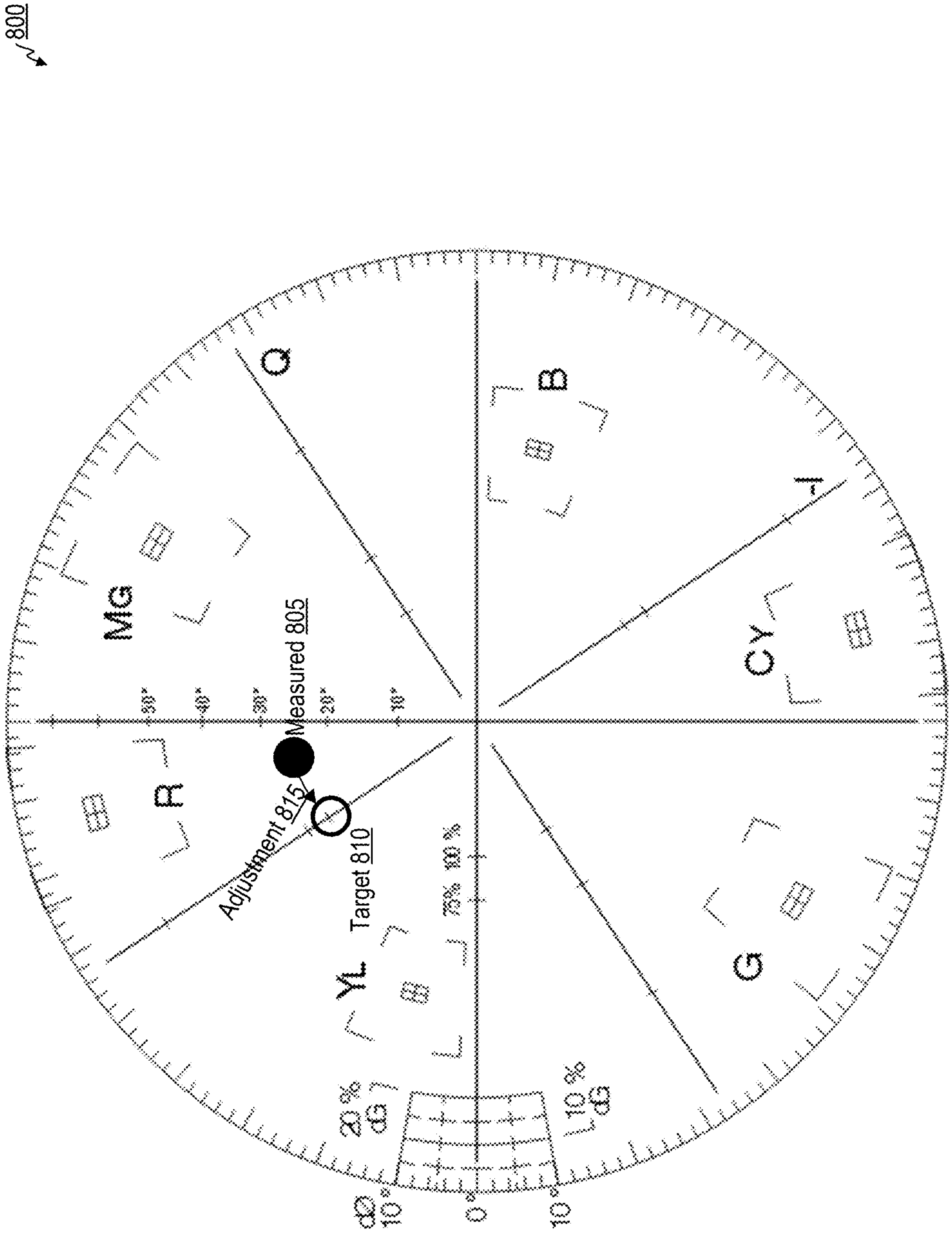
FIG. 8 is a conceptual diagram illustrating an adjustment from a measured skin tone to a target skin tone, illustrated along a color circle, in accordance with some examples.

FIG. 8 is a conceptual diagram illustrating an adjustment 815 from a measured skin tone 805 to a target skin tone 810, illustrated along a color circle. The color circle represents a particular color space, with red represented by "R," yellow represented by "$Y_L$," green represented by "G," cyan represented by "$C_Y$," blue represented by "B," and magenta represented by "$M_G$." The color space may be, for instance, the hue-saturation-value (HSV) space, hue-saturation-lightness (HSL) space, the luma-blue-projection-red-projection (YUB) (YCbCr) (YPbPr) space, the luma-in-phase-quadrature (YIQ) space, a rec601 color space, a rec709 color space, a rec2020 color space, a color space associated with a vectorscope tool, or a combination thereof. Vertical and horizontal axes are illustrated in the color circle. Diagonal lines are illustrated, including an in-phase line (marked "I") and a quadrature line (marked "Q"). The portion of the in-phase line in the upper-left quadrant, near the red color ("R"), is the skin tone line, which can also be referred to as the skin hue line, the skin chroma line, the flesh tone line, the flesh hue line, the flesh chroma line, and/or the in-phase (I) line. A black dot represents the measured skin tone 805. A white dot on the skin tone line represents the target skin tone 810, which can be the closest spot to the measured skin tone 805 along the skin tone line that is the same distance from the center of the color circle as the measured skin tone 805 is. An arrow from the black dot (representing the measured skin tone 805) to the white dot (representing the target skin tone 810) represents the adjustment 815 from the measured skin tone 805 to the target skin tone 810.

In some examples, the measured skin tone 805 may represent an average of a group of varying skin tones in an image. The adjustment 815 may shift the entire group over in the color circle by the angle illustrated in the adjustment 815, such that the group of varying skin tones remains varied (e.g., the varying skin tones having the same positioning relative to one another in the color circle), but with the new average of the group of varying skin tones after the adjustment 815 now being the target skin tone 810 instead of the measured skin tone 805.

Figure 9:
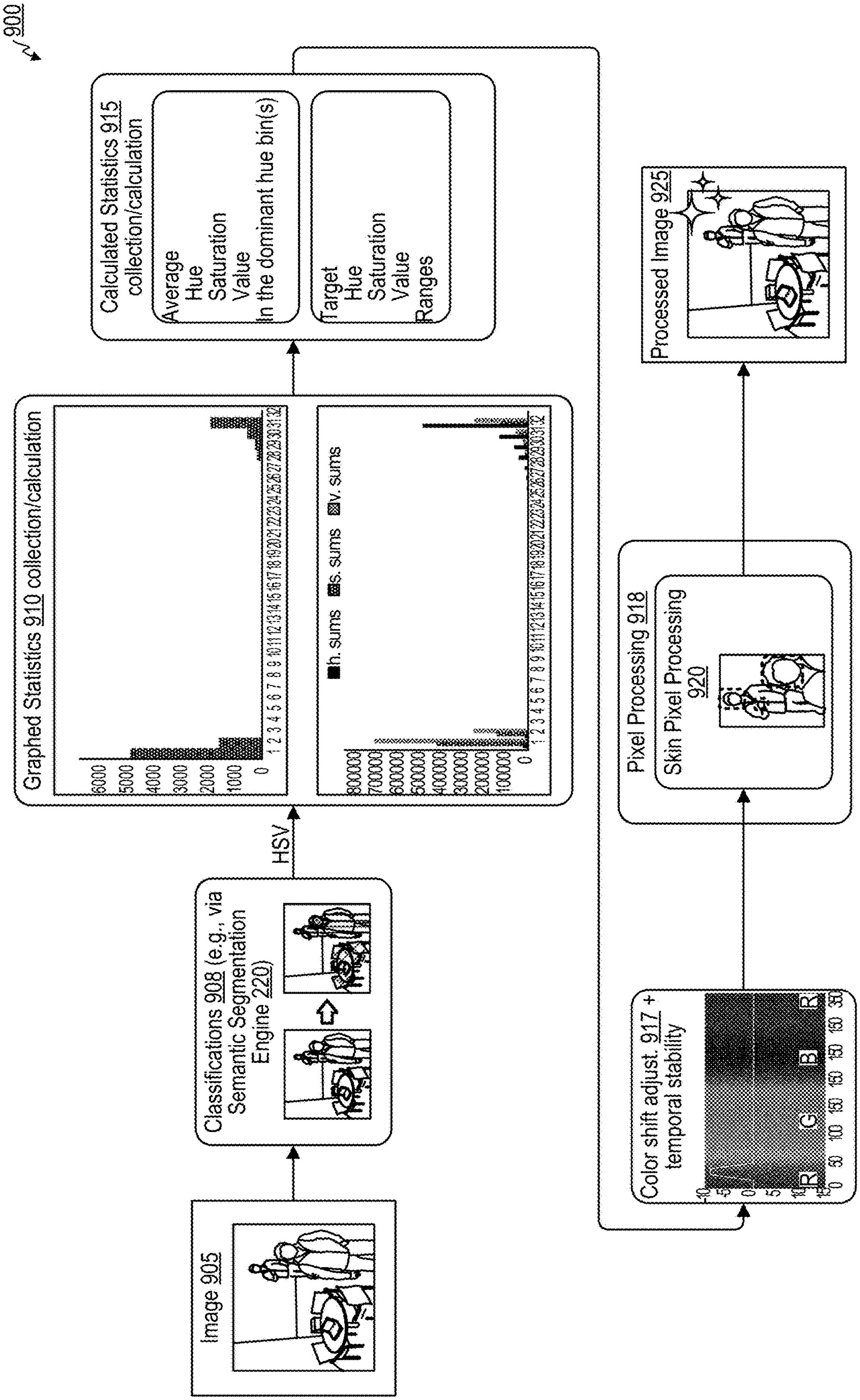
FIG. 9 is a block diagram illustrating a process for skin pixel processing based on image statistics, in accordance with some examples.

FIG. 9 is a block diagram illustrating a process 900 for skin pixel processing based on image statistics. In the process 900, classifications 908 for an image 905 are generated using semantic segmentation engine 220. The process 900 also includes obtaining measured skin tones from the image 905 (e.g., in some cases analyzing the image 905 in the hue-saturation-value (HSV) color space) and gathering, collecting, and/or calculating statistics about the measured skin tones, illustrated in FIG. 9 as including graphed statistics 910 and calculated statistics 915. The graphed statistics 910 include histograms in which the horizontal axis splits the color wheel into 32 segments (or bins) marked 1 to 32 (e.g., each bin representing a span of 11.25 degrees along the color wheel), and the vertical axis indicates counts or "hits" (e.g., of pixels, of sums of values, etc.) falling within the respective bins. The top graph indicates how many pixels in the image 905 have hues falling into each of the 32 segments (or bins) of the color wheel. The bottom graph indicates sums for hue (in blue), saturation (in orange), and value (in grey) (under the HSV color space) for all of the pixels falling under each of the 32 segments (or bins) of the color wheel. Splitting the color wheel into 32 segments (or bins) provides enough granularity to generate accurate color shift adjustments 917. In some examples, for the histograms in the graphed statistics 910, the color wheel may be split into more or fewer bins than 32, such as 10, 20, 30, 40, 50, 60, 70, 80, or 90.

These numbers of pixels per segment, and sums per segment, are used to calculate (in the calculated statistics 915) average hue, average saturation, and average value in each of the segments. This, in turn, allows for determination of average hue, average saturation, and average value for the current skin tone (and/or for the target skin tone), as well as ranges of adjustments. These can be used to generate the color shift adjustments 917, which are applied to the image 905 via skin pixel processing 920 to generate the image 925. The skin pixel processing 920 may be part of pixel processing 918 more generally, for processing the pixels of the image 605. In some examples, the statistics (e.g., graphed statistics 910 and/or calculated statistics 915) and/or color shift adjustment 917 discussed above refer to statistics and/or adjustments that also apply to other aspects of the pixel processing 918 more generally, not just to skin pixel processing 920. In some examples, the statistics (e.g., graphed statistics 910 and/or calculated statistics 915) and/or color shift adjustment 917 discussed above refer to statistics and/or adjustments that only apply to skin pixel processing 920, while other aspects of the pixel processing 918 are handled separately with different statistics and/or adjustments. The color shift adjustment 917 is illustrated in FIG. 9 graphed along a plane with a horizontal axis representing visible light hues or frequencies (and thus colors) and a vertical axis representing output offset (in terms of degrees in a color wheel as in FIG. 8). The plane includes representations of a spectrum of different colors along the horizontal axis as well, with portions of the spectrum representing red marked with an "R," portion(s) of the spectrum representing green marked with a "G," and portion(s) of the spectrum representing blue marked with a "B."

In some examples, the semantic segmentation engine 220 can identify an area with a particular object or object type (here, skin) within a bounding box (e.g., a rectangle) as a form of classifications 908, for instance using face detection. In such a solution, the sensor data processor 215 can perform object-specific pixel processing (e.g., skin pixel processing 920) to generate a processed image (e.g., the image 925), for instance by looking for pixels within a predetermined threshold distance of the skin tone line to be adjusted. In some examples, the relative adjustment of pixel characteristics (e.g., for skin tone) decreases as the absolute required adjustment (e.g., the distance from the measured skin tone to a target skin tone on the skin tone line) increases. until eventually the relative adjustment of pixel characteristics (e.g., for skin tone) decreases to zero. This can provide decision smoothness and avoid sudden changes. For instance, in some examples, in situations where a face is detected but the skin is far away from the skin tone line (e.g., past a predetermined maximum angle on the color circle), there may be a strong colorful light on the person's face, in which case the person's skin tone would not be adjusted toward the skin tone line, or would be only minimally adjusted toward the skin tone line. Color adjustments beyond a predetermined maximum angle on the color circle can be avoided, skipped, and/or reduced. In this way, some faces and/or pixels can be skipped from statistics gathering and/or processing, and/or can undergo reduced processing.

In some examples, in a single interaction over the pixels, the process 900 can count the number of the pixels collected that meet the criteria of the previous step (e.g., being identified via face detection and falling within the predetermined distance of the skin tone line). The process 900 can generate a histogram over hue (in this example 32 bins, each bin representing an 11.25 degree slice in the color circle/wheel). The process 900 can omit pixels below a predetermined saturation lower bound threshold and/or predetermined brightness lower bound threshold from being analyzed in the statistics and/or from being modified via the skin tone color shift adjustment, since low-saturation and/or low-brightness pixels might not represent natural skin and should not be included (and/or since hue and/or tone can vary more widely at low brightness and saturation values due to noise). The process 900 can omit pixels above a predetermined saturation upper bound threshold and/or predetermined brightness upper bound threshold from being analyzed in the statistics and/or from being modified via the skin tone color shift adjustment, since high-saturation and/or high-brightness pixels might not represent natural skin and should not be included (and/or since hue and/or tone can vary more widely at high brightness and saturation values due to noise). Each bin (or segment) includes, in some examples, a bin hits count, a hue sum, a saturation sum, and a brightness (value) sum.

In some examples, the process 900 includes picking the dominant bin (e.g., having the highest hit count in terms of number of pixels). In some examples, the process 900 includes picking another ($2^{nd}$) bin. In some examples, the process 900 includes calculating the polarity of the dominant bin hue in relation to closest target hue in the range, per Equation 1 below:

Dominant_bin_avg_hue = dominant_hue_bin_sum/dominant_hue_bin_hits     Equation 1

The $2^{nd}$ bin is the adjacent bin in the direction from dominant to target. The process 900 includes calculating the average hue of the $2^{nd}$ bin similarly to Equation 1 above.

The process 900 can include calculating the weighted mean of the 2 bins. For hue, the process 900 can use a weighted circular mean. For saturation and value, the process 900 can use a normal weighted mean. The process 900 can calculate a measurement confidence by dividing the sum of the bins hit counts by the pixels collected previously, and in some cases applying a function to change sensitivity. While the process 900 is illustrated for skin tone adjustment, it should be understood that it can be applied to adjust hues, tones, colors, brightness values, luma values, and/or other pixel characteristics for other types of objects, such as hair, clothes, sky, plant(s), water, concrete, asphalt, metal, and/or other objects and/or object types discussed herein. In some examples, the image 605 may be a video frame of a video. Where the sensor data 210 includes video (e.g., with the image 605 as a video frame), the process 900 may also apply one or more temporal stability mechanisms, such as an infinite impulse response (IIR) filter and/or a direction confidence algorithm.

Figure 10:
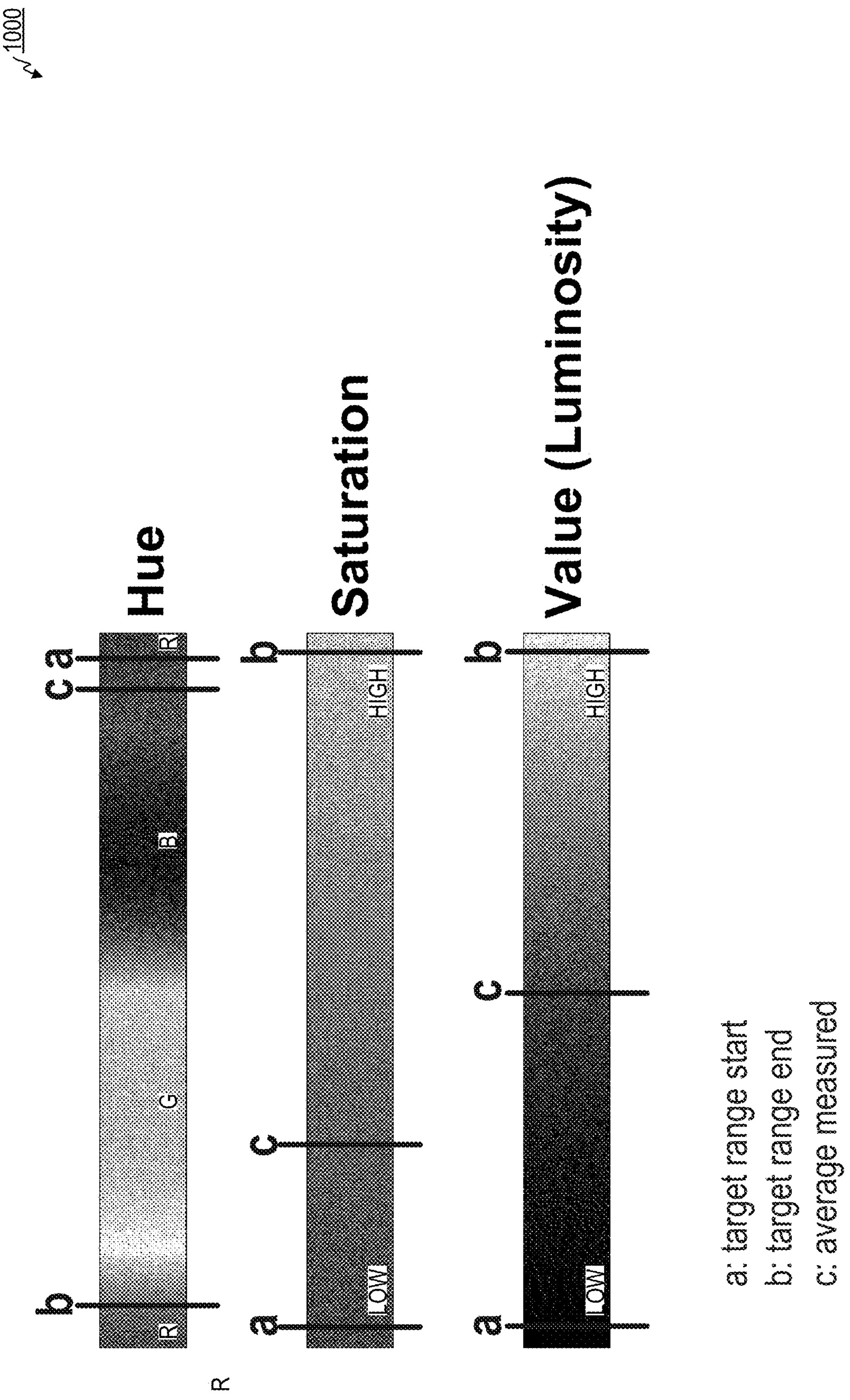
FIG. 10 is a conceptual diagram illustrating measured skin tone and target skin tone along sliders representing hue, saturation, and value (lightness), respectively, in the hue-saturation-value (HSV) color space, in accordance with some examples.

FIG. 10 is a conceptual diagram 1000 illustrating measured skin tone and target skin tone along sliders representing hue, saturation, and value (lightness), respectively, in the hue-saturation-value (HSV) color space. Hue is represented by the slider marked "Hue." The hue slider includes representations of a spectrum of different colors along the horizontal axis as well, with portions of the spectrum representing red marked with an "R," portion(s) of the spectrum representing green marked with a "G," and portion(s) of the spectrum representing blue marked with a "B." Saturation is represented by the slider marked "Saturation" with a range of values from low saturation (represented in FIG. 10 by darker shades and the text "low") to high saturation (represented in FIG. 10 by brighter shades and the text "high"). Value (lightness and/or brightness) is represented by the slider marked "Value (Luminosity)" with a range of values from low luminosity (represented in FIG. 10 by darker shades and the text "low") to high luminosity (represented in FIG. 10 by brighter shades and the text "high"). The points marked "a" and "b" represent the start and end of a target range, respectively. The points marked "c" represent the average measured hue, saturation, and value.

In some examples, the process 900 includes calculating the required adjustment to the weighted means to reach the closets target range ("a" or "b"). In the illustrative example illustrated in the conceptual diagram 1000, the following may be used:

$$Hue\colon a = b = 0.0514\ (rec.709)$$

$$Sat\colon a = 0;\ b = 1$$

$$Val\colon a = 0;\ b = 1$$

In some examples, the process 900 includes decreasing the adjustment according to several factors, including required adjustment, measurement confidence (discussed above), and distance of the current (measured) pixel from the weighted mean (e.g., as represented by the color "trapezoid" in the color shift adjustment 715 and/or the color shift adjustment 917). As a required adjustment is larger, a relative adjustment can be decreased to a point of no adjustment. Note that a color wheel is cyclic. Thus, it should be understood that the hue slider in the conceptual diagram 1000 is meant to be cyclic, with the illustrated beginning and end connecting to one another. In some examples, 'a' and 'b' can define a range of degrees, while 'c' is a measured value. In some examples, the process 900 includes bringing 'c' toward 'a' or 'b' (whichever is closer), if 'c' is outside of the [a,b] range. In some examples, 'a,' 'b,' and/or 'c' can refer to colors indicated by angles in a color circle (e.g., vectorscope) and/or color wheel.

In some examples, the process 900 includes stabilizing decisions in the temporal domain using a filtration with previous decision(s). For instance, for hue, if the adjustment direction of several sequential previous decisions (e.g., previous color shift adjustments) is opposite to current adjustment, the process 900 can include setting the current adjustment to 0, since this opposite-direction adjustment is likely incorrect. For hue, saturation, and value, the process 900 can include alpha-blending the current decision with previous decision(s) (e.g., previous color shift adjustments).

In some examples, the process 900 includes inspecting the statistics and adjustments on the fly through the processing pipeline under the specified object type (e.g., skin).

Figure 11A:
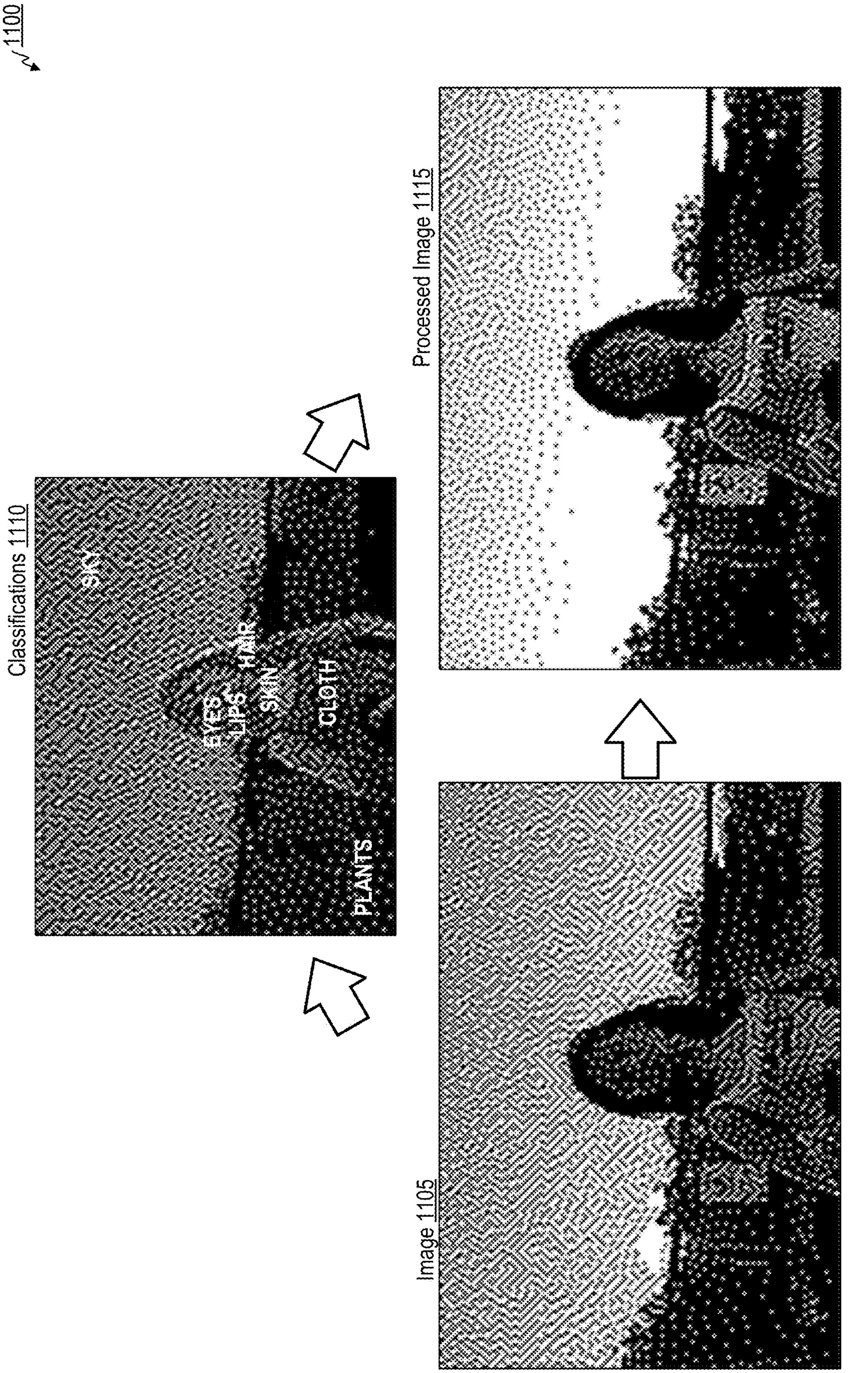
FIG. 11A is a conceptual diagram illustrating an image, classifications for the image based on semantic segmentation, and a processed image with an adjusted skin tone based on the image and the classifications, in accordance with some examples.

FIG. 11A is a conceptual diagram illustrating an image 1105, classifications 1110 for the image based on semantic segmentation, and a processed image 1115 with an adjusted skin tone based on the image 1105 and the classifications 1110. In some examples, the hue, saturation, value, and/or other image processing parameters may differ in the processed image 1115 compared to the image 1105, based on the classifications 1110. In FIG. 11A, the processed image 1115 is illustrated as having a slightly lighter sky and higher color contrast at and around clothing, skin, and plants, for example.

Figure 11B:
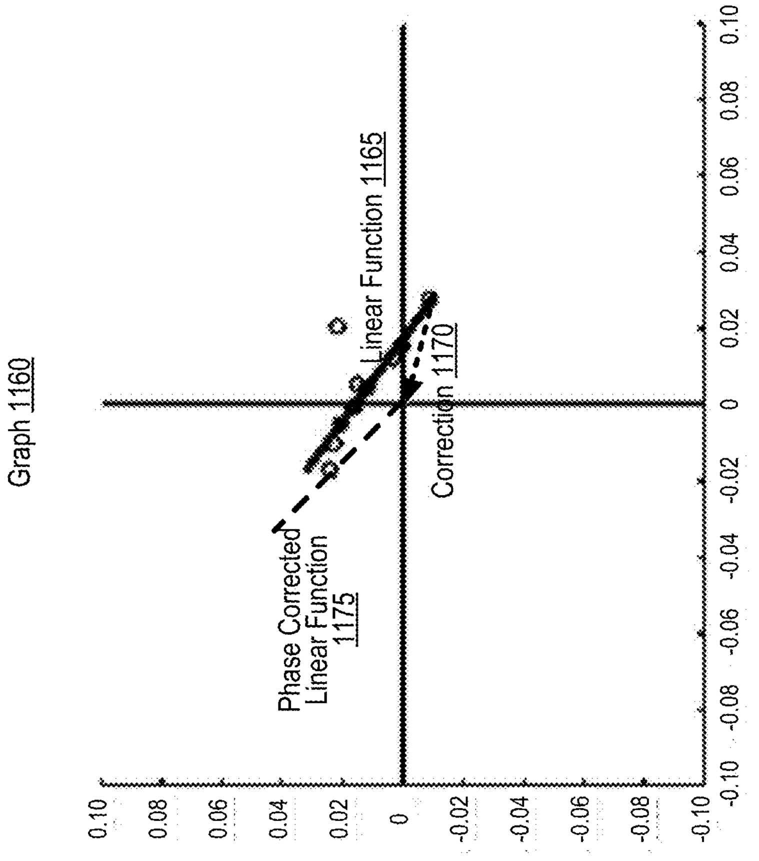
FIG. 11B is a conceptual diagram illustrating a graph showing a phase correction that can be used for imaging operations, in accordance with some examples.

FIG. 11B is a conceptual diagram 1150 illustrating a graph 1160 showing a phase correction that can be used for imaging operations. In some examples, an image may have a wide spread of skin tones in areas of an image determined to depict skin. For instance, rather than having skin tones falling into 6 bins (with the vast majority of pixels falling into 3 bins) as in the graphed statistics 910 of FIG. 9, an image may have skin tones falling into 10, 15, or even 20 bins, with significant hit count weight (e.g., with a majority of pixels falling into a relatively large number of bins such as 5, 10, 15, or 20). Such a wide spread of skin tones may occur for a variety of reasons, such as unusual lighting in a scene (e.g., multiple light sources that each have a different color cast), issues with white balance and/or black balance, compression artifacts that introduce unusual colors, noise, other image artifacts, or combinations thereof. In such cases, a dominant hue bin can in some cases not even be a natural skin tone or a dominant tone, but can for instance be a skin tone that is between two other dominant tones. In situations where an image includes a wide spread of skin tones, for instance skin tones that are spread across at least (or more than) a threshold number of bins, shifting all of the pixels across all of those bins at once can generate artifacts, for instance introducing blues, greens, or other unusual colors into skin. On the other hand, shifting only a few dominant skin tones can cause issues from shifting only certain local regions of a person's skin in an image, potentially also causing artifacts, or in some cases producing an effect that is difficult to notice as the effect is applied to a relatively narrow hue band (e.g., which may be distant from other hues used in the image).

One solution is to perform a phase correction. When an imaging system detects (e.g., by compiling image statistics such as the graphed statistics 910 of FIG. 9) that pixels representing skin in an image are spread across at least (or more than) a threshold number of bins (e.g., 5 bins, 10 bins, 15 bins, 20 bins, more than 20 bins, or an amount in between any two previously-listed amounts), the imaging system can initiate a phase correction process. In some examples, bins are only counted toward the threshold if they have at least a threshold number of pixels.

As part of the phase correction process, the imaging system can scatter the bins (e.g., over the CbCr plane and/or the YCbCr space). In the graph 1160, points representing the different bins are illustrated as white circles with black outlines. As part of the phase correction process, the imaging system can fit a linear function 1165 to the points representing the different bins in the graph 1160, for instance using Random Sample Consensus (RANSAC) or another fitting algorithm. The imaging system can calculate a distance between the center of the graph 1160 and the point along the linear function 1165 that is the furthest to the bottom-right of the graph 1160. As part of the phase correction process, the imaging system can determine gain adjustments for red, green, and/or blue to move the point along the linear function 1165 that is the furthest to the bottom-right of the graph 1160 to, or closer to, the center of the graph 1160. This movement is illustrated by the dotted arrow labeled as the correction 1170 in the graph 1160. In the example illustrated in FIG. 11B, the gain values and calculations used to perform the movement (the correction 1170) include [Red]*(1.08) and [Green, Red]*1.1. It may be beneficial for the imaging system to avoid gain values lower than 1, hence use of green and red as complementary. Because the graph 1160 is in the YCbCr space and the correction 1170 is in the RGB space, the phase corrected linear function 1175 that results from the correction 1170 can also have a different angle in the YCbCr space than the linear function 1165.

The imaging system can apply different weights to the correction based on different factors. For instance, the number of bins that the skin tones span in an image can be a factor in how much correction is applied. In an illustrative example, the higher the number of bins that the skin tones span in an image, the greater the amount of correction is applied. In some examples, the amount, or distance, of the correction, can be a factor in how much correction is applied. For instance, in an illustrative example, if the distance between the center of the graph and the point along the linear function that is the furthest to the bottom-right of the graph is small (e.g., less than a threshold), then the imaging system may correct the full distance, shifting the linear function so that its bottom-right point is at the center of the graph. On the other hand, if the distance between the center of the graph and the point along the linear function that is the furthest to the bottom-right of the graph is large (e.g., exceeding a threshold), then the imaging system may correct only by a part of the full distance, shifting the linear function so that its bottom-right point is closer to, but not at, the center of the graph.

In some examples, as part of the phase correction process, the imaging system can calculate, for each bin, the average values for hue (H), saturation (S), and brightness/luma/value (V). The imaging system can convert each of these bin averages to the red-green-blue (RGB) color space, and adjust each bin according to the phase correction (e.g., the correction 1170). The imaging system can translate each bin back into the HSV color space (and/or the YCbCr color space), and rearrange the histogram and/or graph accordingly.

In some examples, the phase shift correction illustrated and discussed with respect to FIG. 11B can be performed as part of calculation of a color shift adjustment for skin pixel processing, for instance as part of the object-specific pixel characteristic change 235, skin pixel processing 620, the calculation of the adjustment 710, the color shift adjustment 715, skin pixel processing 720, the calculation of the adjustment 815, the skin pixel processing 920, the hue adjustment of operation 1315, or a combination thereof.

Figure 12:
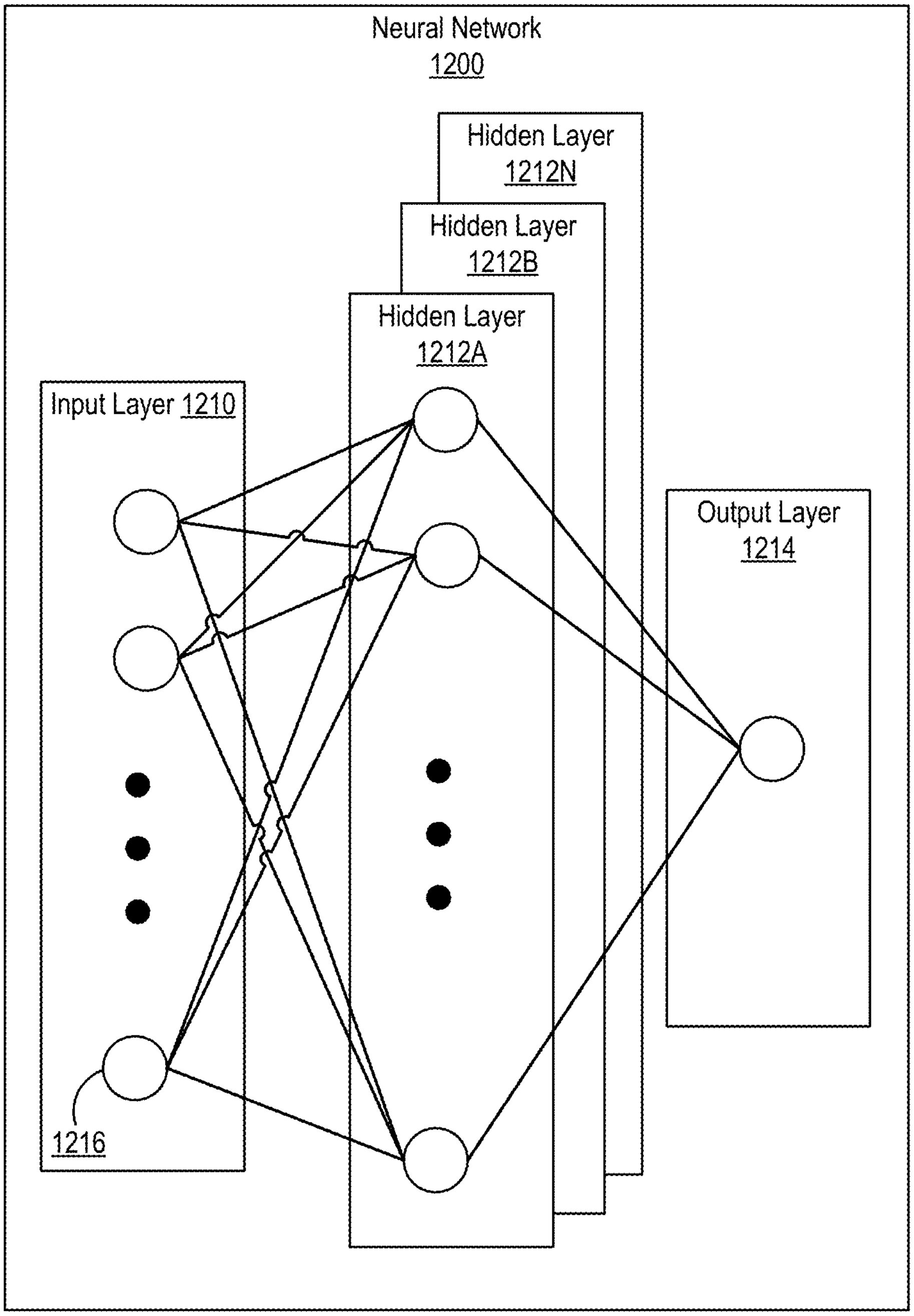
FIG. 12 is a block diagram illustrating an example of a neural network that can be used for imaging operations, in accordance with some examples.

FIG. 12 is a block diagram illustrating an example of a neural network (NN) 1200 that can be used for imaging operations. The neural network 1200 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 1200 may be an example of the trained ML model(s) 280. The neural network 1200 may used by various subsystems of the sensor data processing system 200, such as the sensor data processor 215, the semantic segmentation engine 220, the object-specific pixel characteristic adjuster 225, the output device(s) 260, the skin pixel processing 620, the skin pixel processing 720, the skin pixel processing 920, the imaging system that performs the process 1300 (e.g., for operation 1310 and/or operation 1315), the computing system 1400, or some combination thereof.

An input layer 1210 of the neural network 1200 includes input data. The input data of the input layer 1210 can include data representing the pixels of one or more input image frames. In some examples, the input data of the input layer 1210 includes data representing the pixels of image data. Examples of the image data include an image captured using the image capture and processing system 100, the sensor data 210, an image captured by one of the cameras 330A-330D, an image captured by one of the cameras 430A-430D, the image 510, the image 605, the image 905, the image 1105, the image received in operation 1305, an image captured using the input device 1445, any other image data described herein, any other sensor data described herein, or a combination thereof. The input data in the input layer 1210 can also include other data, such as data corresponding to possible object types that the image data can be classified into (e.g., for the classifications 230, classifications 520, classifications 610, and/or classifications 1110).

The images can include image data from an image sensor including raw pixel data (including a single color per pixel based, for example, on a Bayer filter) or processed pixel values (e.g., RGB pixels of an RGB image). The neural network 1200 includes multiple hidden layers 1212, 1212B, through 1212N. The hidden layers 1212, 1212B, through 1212N include "N" number of hidden layers, where "N" is an integer greater than or equal to one. The number of hidden layers can be made to include as many layers as needed for the given application. The neural network 1200 further includes an output layer 1214 that provides an output resulting from the processing performed by the hidden layers 1212, 1212B, through 1212N.

The output layer 1214 can provide output data for an operation performed using the NN 1200. For instance, the output layer 1214 can provide output data such as the classifications 230, the object-specific pixel characteristic change 235, the processed sensor data 240, the classifications 520, the classifications 610, the static configuration 615, the skin pixel processing 620, the processed image 625, the calculation of the adjustment 710, the color shift adjustment 715, the skin pixel processing 720, the processed image 725, the determination of the target skin tone 810, the adjustment 815, classifications associated with the semantic segmentation of the image 905, the graphed statistics 910, the calculated statistics 915, the color shift adjustment 917, the skin pixel processing 920, the processed image 925, the target range start in FIG. 10, the target range end in FIG. 10, the classifications 1110, the processed image 1115, the determination of operation 1310, the adjustment of operation 1315, or a combination thereof.

The neural network 1200 is a multi-layer neural network of interconnected filters. Each filter can be trained to learn a feature representative of the input data. Information associated with the filters is shared among the different layers and each layer retains information as information is processed. In some cases, the neural network 1200 can include a feed-forward network, in which case there are no feedback connections where outputs of the network are fed back into itself. In some cases, the network 1200 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 1210 can activate a set of nodes in the first hidden layer 1212A. For example, as shown, each of the input nodes of the input layer 1210 can be connected to each of the nodes of the first hidden layer 1212A. The nodes of a hidden layer can transform the information of each input node by applying activation functions (e.g., filters) to this information. The information derived from the transformation can then be passed to and can activate the nodes of the next hidden layer 1212B, which can perform their own designated functions. Example functions include convolutional functions, downscaling, upscaling, data transformation, and/or any other suitable functions. The output of the hidden layer 1212B can then activate nodes of the next hidden layer, and so on. The output of the last hidden layer 1212N can activate one or more nodes of the output layer 1214, which provides a processed output image. In some cases, while nodes (e.g., node 1216) in the neural network 1200 are shown as having multiple output lines, a node has a single output and all lines shown as being output from a node represent the same output value.

In some cases, each node or interconnection between nodes can have a weight that is a set of parameters derived from the training of the neural network 1200. For example, an interconnection between nodes can represent a piece of information learned about the interconnected nodes. The interconnection can have a tunable numeric weight that can be tuned (e.g., based on a training dataset), allowing the neural network 1200 to be adaptive to inputs and able to learn as more and more data is processed.

The neural network 1200 is pre-trained to process the features from the data in the input layer 1210 using the different hidden layers 1212, 1212B, through 1212N in order to provide the output through the output layer 1214.

Figure 13:
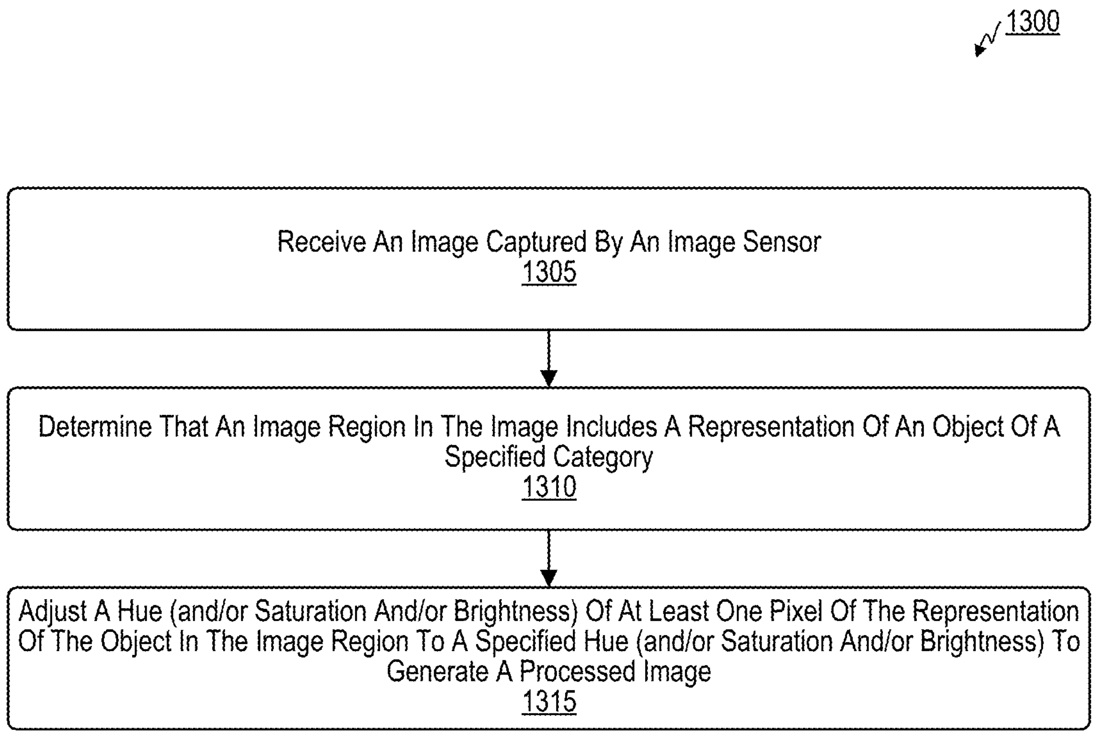
FIG. 13 is a flow diagram illustrating a process for imaging, in accordance with some examples.

FIG. 13 is a flow diagram illustrating a process 1300 for imaging. The process 1300 may be performed by an imaging system. In some examples, the imaging system can include, for example, the image capture and processing system 100, the image capture device 105A, the image processing device 105B, the image processor 150, the ISP 154, the host processor 152, the sensor data processing system 200, the sensor 205, the sensor data processor 215, the semantic segmentation engine 220, the object-specific pixel characteristic adjuster 225, the output device(s) 260, the trained ML model 280, the feedback engine 285, the HMD 310, the mobile handset 410, an engine for the pixel processing 618, an engine for the skin pixel processing 620, an engine for measuring skin tone 705, an engine for calculating adjustment 710, an engine for the pixel processing 718, an engine for the skin pixel processing 720, an engine for classifications 908, an engine for the pixel processing 918, an engine for the skin pixel processing 920, an engine for generating the processed image 1115, an engine for calculating the correction 1170, the neural network 1200, the computing system 1400, the processor 1410, an apparatus, a system, a non-transitory computer-readable medium coupled to a processor, or a combination thereof.

At operation 1305, the sensor data processing system (or a subset thereof) is configured to, and can, receive an image captured by an image sensor. In some examples, the sensor data processing system includes the image sensor.

Examples of the image sensor includes the image sensor 130, the sensor(s) 205, the first camera 330A, the second camera 330B, the third camera 330C, the fourth camera 330D, the first camera 430A, the second camera 430B, the third camera 430C, the fourth camera 430D, an image sensor used to capture the image 510, an image sensor used to capture the image 605, an image sensor used to capture the image 905, an image sensor used to capture the image 1105, an image sensor used to capture an image used as input data for the input layer 1210 of the NN 1200, the input device 1445, another image sensor described herein, another sensor described herein, or a combination thereof. Examples of the image includes the sensor data 210, the image 510, the image 605, the image 905, the image 1105, an image used as input data for the input layer 1210 of the NN 1200, an image captured by the any of the examples of the image sensor listed above, or a combination thereof.

At operation 1310, the sensor data processing system (or a subset thereof) is configured to, and can, determine that an image region in the image includes a representation (e.g., depiction) of an object of a specified category. At operation 1315, the sensor data processing system (or a subset thereof) is configured to, and can, adjust a hue of at least one pixel of the representation of the object in the image region to a specified hue to generate a processed image. Examples of the adjustment to the hue include the calculated adjustment 710, the color shift adjustment 715, the adjustment 815, the color shift adjustment 917, another hue adjustment discussed herein, or a combination thereof.

In some examples, the sensor data processing system (or a subset thereof) is configured to, and can, output the processed image. In some aspects, the sensor data processing system (or a subset thereof) is configured to, and can, cause display of the processed image using a display (e.g., output device(s) 260, display(s) 340, display 440, output device 1435). In some aspects, the sensor data processing system (or a subset thereof) is configured to, and can, cause the processed image to be sent to a recipient device using a communication interface (e.g., output device(s) 260, output device 1435, communication interface 1440). In some examples, the imaging system includes a display, a communication interface, a communication transmitter, a communication transceiver, a transmitter, a transceiver, another output device for outputting the processed image, or a combination thereof.

In some aspects, the specified category is skin, the object includes at least a portion of a person, and the specified hue is associated with the skin (e.g., as in the skin pixel processing 620, the measurement of the skin tone 705 compared to the target skin tone, the skin pixel processing 720, and the skin pixel processing 920). In an illustrative example, the measured skin tone 805 is an example of the hue of the at least one pixel, and the target skin tone 810 is an example of the specified hue. In some aspects, the portion of the person includes at least one of a face of the person, a hand of the person, another body part of a person, or a combination thereof. In some aspects, the specified category is plant matter, the object includes at least a portion of a plant, and the specified hue is associated with the plant matter. In some aspects, the specified category is sky, the object includes a region of the sky, and the specified hue is associated with the sky.

In some aspects, to generate the processed image (in operation 1315), the sensor data processing system (or a subset thereof) is configured to, and can, adjust a brightness, a saturation, a tone, a noise reduction level, a contrast, or another image processing property of at least one pixel of the representation of the object in the image region. Any of these changes can be included in the object-specific pixel characteristic change 235, for example.

In some aspects, the sensor data processing system (or a subset thereof) is configured to, and can, calculate average hue, average saturation, and/or average brightness for a plurality of bins corresponding to different color ranges in the image. In some examples, to adjust the hue of the at least one pixel in operation 1315, the sensor data processing system (or a subset thereof) is configured to, and can, adjust the hue based on the average hue. In some examples, to generate the processed image in operation 1315, the sensor data processing system (or a subset thereof) is configured to, and can, adjust a saturation of the image based on the average saturation. In some examples, to generate the processed image in operation 1315, the sensor data processing system (or a subset thereof) is configured to, and can, adjust a brightness of the image based on the average brightness.

In some aspects, the sensor data processing system (or a subset thereof) is configured to, and can, perform a color phase correction (e.g., correction 1170) on the at least one pixel of the representation of the object in the image region to adjust the hue of the at least one pixel of the representation of the object in the image region.

In some aspects, the sensor data processing system includes means for receiving an image captured by an image sensor, such as the image sensor 130, the sensor(s) 205, the first camera 330A, the second camera 330B, the third camera 330C, the fourth camera 330D, the first camera 430A, the second camera 430B, the third camera 430C, the fourth camera 430D, an image sensor used to capture the image 510, an image sensor used to capture the image 605, an image sensor used to capture the image 905, an image sensor used to capture the image 1105, an image sensor used to capture an image used as input data for the input layer 1210 of the NN 1200, the input device 1445, another image sensor described herein, another sensor described herein, or a combination thereof. In some aspects, the sensor data processing system includes means for determining that an image region in the image includes a representation of an object of a specified category and means for adjusting a hue of at least one pixel of the representation of the object in the image region to a specified hue to generate a processed image, such as the image capture and processing system 100, the image processing device 105B, the image processor 150, the ISP 154, the host processor 152, the sensor data processing system 200, the sensor data processor 215, the semantic segmentation engine 220, the object-specific pixel characteristic adjuster 225, the output device(s) 260, the trained ML model 280, the feedback engine 285, the HMD 310, the mobile handset 410, the engine for the pixel processing 618, the engine for the skin pixel processing 620, the engine for measuring skin tone 705, the engine for calculating adjustment 710, the engine for the pixel processing 718, the engine for the skin pixel processing 720, the engine for classifications 908, the engine for the pixel processing 918, the engine for the skin pixel processing 920, the neural network 1200, the computing system 1400, the processor 1410, or a combination thereof.

In some examples, the processes described herein (e.g., the respective processes of FIGS. 1, 2, 5, 6, 7, 8, 9, 10, 11, 12, the process 1300 of FIG. 13, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the sensor data processing system 200, the neural network 1200, the imaging system that performs the process 1300, the computing system 1400, the processor 1410, an apparatus, a system, a non-transitory computer-readable medium coupled to a processor, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
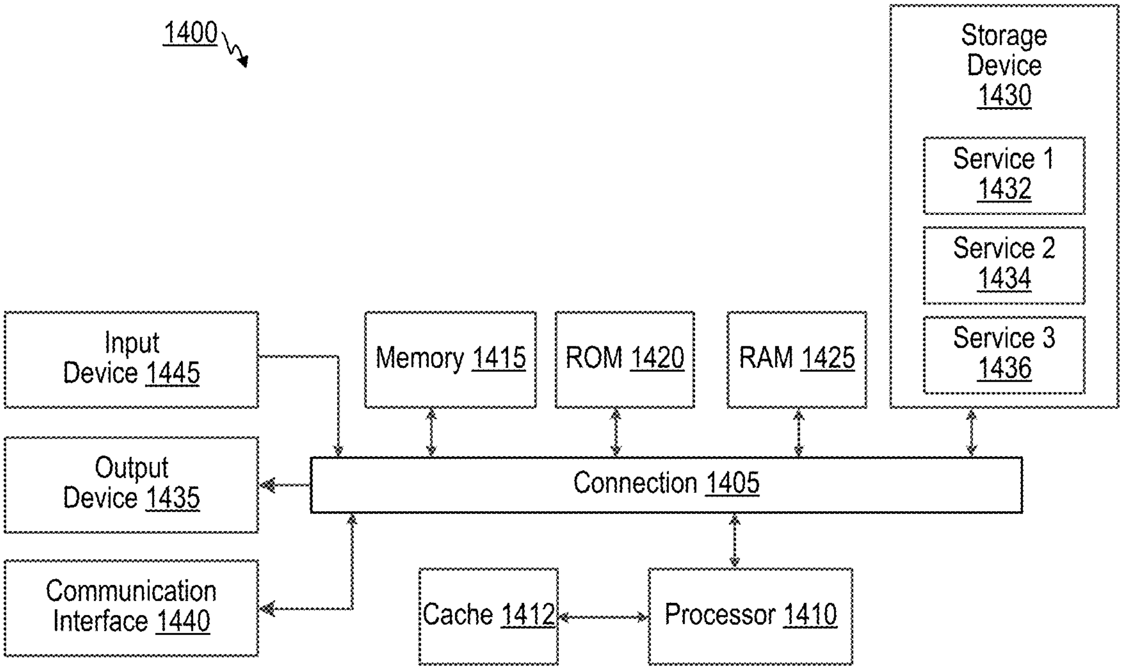
FIG. 14 is a diagram illustrating an example of a computing system for implementing certain aspects described herein.

FIG. 14 is a diagram illustrating an example of a system for implementing certain aspects of the present technology. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some aspects, computing system 1400 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1402.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some aspects, a hardware service that performs a particular function can include the software component stored in a computer-readable medium in connection with the necessary hardware components, such as processor 1410, connection 1405, output device 1435, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for imaging, the apparatus comprising: at least one memory; and at least one processor coupled to the at least one memory and configured to: receive an image captured by an image sensor; determine that an image region in the image includes a representation of an object of a specified category; and adjust a hue of at least one pixel of the representation of the object in the image region to a specified hue to generate a processed image.

Aspect 2. The apparatus of Aspect 1, the at least one processor configured to: adjust respective hues of the at least one pixel of the representation of the object toward a hue line, the hue line represented by a specified angle in a color circle.

Aspect 3. The apparatus of any of Aspects 1 to 2, wherein the specified category is skin, wherein the object includes at least a portion of a person, and wherein the specified hue is associated with the skin.

Aspect 4. The apparatus of Aspect 3, wherein the portion of the person includes at least one of a face of the person or a hand of the person.

Aspect 5. The apparatus of any of Aspects 1 to 4, wherein the specified category is plant matter, wherein the object includes at least a portion of a plant, and wherein the specified hue is associated with the plant matter.

Aspect 6. The apparatus of any of Aspects 1 to 5, wherein the specified category is sky, wherein the object includes a region of the sky, and wherein the specified hue is associated with the sky.

Aspect 7. The apparatus of any of Aspects 1 to 6, the at least one processor configured to: adjust a brightness of at least one pixel of the representation of the object in the image region to generate the processed image.

Aspect 8. The apparatus of any of Aspects 1 to 7, the at least one processor configured to: adjust a saturation of at least one pixel of the representation of the object in the image region to generate the processed image.

Aspect 9. The apparatus of any of Aspects 1 to 8, the at least one processor configured to: adjust a tone of at least one pixel of the representation of the object in the image region to generate the processed image.

Aspect 10. The apparatus of any of Aspects 1 to 9, the at least one processor configured to: calculate average hue, average saturation, and average brightness for a plurality of bins corresponding to different color ranges in the image; adjust the hue based on the average hue to adjust the hue of the at least one pixel; adjust a saturation of the image based on the average saturation to generate the processed image; and adjust a brightness of the image based on the average brightness to generate the processed image.

Aspect 11. The apparatus of any of Aspects 1 to 10, the at least one processor configured to: output the processed image.

Aspect 12. The apparatus of any of Aspects 1 to 11, the at least one processor configured to: cause display of the processed image using a display.

Aspect 13. The apparatus of any of Aspects 1 to 12, the at least one processor configured to: cause the processed image to be sent to a recipient device using a communication interface.

Aspect 14. The apparatus of any of Aspects 1 to 13, the at least one processor configured to: perform a color phase correction on the at least one pixel of the representation of the object in the image region to adjust the hue of the at least one pixel of the representation of the object in the image region.

Aspect 15. The apparatus of any of Aspects 1 to 14, wherein the apparatus includes at least one of a head-mounted display (HMD), a mobile handset, or a wireless communication device.

Aspect 16. A method for imaging, the method comprising: receiving an image captured by an image sensor; determining that an image region in the image includes a representation of an object of a specified category; and adjusting a hue of at least one pixel of the representation of the object in the image region to a specified hue to generate a processed image.

Aspect 17. The method of Aspect 16, further comprising: adjust respective hues of the at least one pixel of the representation of the object toward a hue line, the hue line represented by a specified angle in a color circle.

Aspect 18. The method of Aspect 17, wherein the specified category is skin, wherein the object includes at least a portion of a person, and wherein the specified hue is associated with the skin.

Aspect 19. The method of any of Aspects 16 to 18, wherein the portion of the person includes at least one of a face of the person or a hand of the person.

Aspect 20. The method of any of Aspects 16 to 19, wherein the specified category is plant matter, wherein the object includes at least a portion of a plant, and wherein the specified hue is associated with the plant matter.

Aspect 21. The method of any of Aspects 16 to 20, wherein the specified category is sky, wherein the object includes a region of the sky, and wherein the specified hue is associated with the sky.

Aspect 22. The method of any of Aspects 16 to 21, further comprising: adjusting a brightness of at least one pixel of the representation of the object in the image region to generate the processed image.

Aspect 23. The method of any of Aspects 16 to 22, further comprising: adjusting a saturation of at least one pixel of the representation of the object in the image region to generate the processed image.

Aspect 24. The method of any of Aspects 16 to 23, further comprising: adjusting a tone of at least one pixel of the representation of the object in the image region to generate the processed image.

Aspect 25. The method of any of Aspects 16 to 24, further comprising: calculating average hue, average saturation, and average brightness for a plurality of bins corresponding to different color ranges in the image; adjusting the hue based on the average hue to adjust the hue of the at least one pixel; adjusting a saturation of the image based on the average saturation to generate the processed image; and adjusting a brightness of the image based on the average brightness to generate the processed image.

Aspect 26. The method of any of Aspects 16 to 25, further comprising: outputting the processed image.

Aspect 27. The method of any of Aspects 16 to 26, further comprising: causing display of the processed image using a display.

Aspect 28. The method of any of Aspects 16 to 27, further comprising: causing the processed image to be sent to a recipient device using a communication interface.

Aspect 29. The method of any of Aspects 16 to 28, further comprising: performing a color phase correction on the at least one pixel of the representation of the object in the image region to adjust the hue of the at least one pixel of the representation of the object in the image region.

Aspect 30. A non-transitory computer-readable medium having stored thereon instructions that, when executed by one or more processors, cause the one or more processors to perform operations according to any of Aspects 1 to 29.

Aspect 31. An apparatus for imaging, the apparatus comprising one or more means for performing operations according to any of Aspects 1 to 29.

What is claimed is:

1. An apparatus for imaging, the apparatus comprising:
at least one memory; and
at least one processor coupled to the at least one memory, the at least one processor configured to:
receive an image captured by an image sensor;
analyze features of the image to determine that an image region in the image includes a representation of an object of a predetermined category, wherein a hue of at least one pixel of the representation of the object in the image region is outside of a predetermined hue range corresponding to the predetermined category, and wherein the features are distinct from the hue; and
adjust the hue of the at least one pixel of the representation of the object in the image region based on the predetermined hue range to generate a processed image.

2. The apparatus of claim 1, wherein, to generate the processed image, the at least one processor is configured to:

adjust respective hues of a plurality of pixels of the at least one pixel of the representation of the object toward a hue line, wherein the predetermined hue range corresponds to the hue line that is represented by a predetermined angle in a color circle.

3. The apparatus of claim 1, wherein the predetermined category is skin, wherein the object includes at least a portion of a person, and wherein the predetermined hue range is associated with the skin.

4. The apparatus of claim 3, wherein the portion of the person includes at least one of a face of the person or a hand of the person.

5. The apparatus of claim 1, wherein the predetermined category is plant matter, wherein the object includes at least a portion of a plant, and wherein the predetermined hue range is associated with the plant matter.

6. The apparatus of claim 1, wherein the predetermined category is sky, wherein the object includes a region of the sky, and wherein the predetermined hue range is associated with the sky.

7. The apparatus of claim 1, wherein, to generate the processed image, the at least one processor is configured to:

adjust a brightness of at least one pixel of the representation of the object in the image region to generate the processed image.

8. The apparatus of claim 1, wherein, to generate the processed image, the at least one processor is configured to:

adjust a saturation of at least one pixel of the representation of the object in the image region to generate the processed image.

9. The apparatus of claim 1, wherein, to generate the processed image, the at least one processor is configured to:

adjust a tone of at least one pixel of the representation of the object in the image region to generate the processed image.

10. The apparatus of claim 1, wherein, to generate the processed image, the at least one processor configured to:

calculate average hue, average saturation, and average brightness for a plurality of bins corresponding to different color ranges in the image;

adjust the hue based on the average hue to adjust the hue of the at least one pixel and to generate the processed image;

adjust a saturation of the image based on the average saturation to generate the processed image; and adjust a brightness of the image based on the average brightness to generate the processed image.

11. The apparatus of claim 1, wherein the at least one processor is configured to:

output the processed image.

12. The apparatus of claim 1, wherein at least one of the features is luminosity-based.

13. The apparatus of claim 1, wherein the object is a person, and wherein at least one of the features corresponds to at least a portion of a body part corresponding to the person.

14. The apparatus of claim 1, wherein, to generate the processed image, the at least one processor configured to:

apply a color phase correction to the at least one pixel of the representation of the object in the image region to adjust the hue of the at least one pixel of the representation of the object in the image region and to generate the processed image.

15. The apparatus of claim 1, wherein at least one of the features includes at least one edge.

16. The apparatus of claim 1, wherein, to analyze the features of the image, the at least one processor is configured to analyze the features of the image using a semantic segmentation algorithm.

17. The apparatus of claim 1, wherein, to analyze the features of the image, the at least one processor is configured to analyze the features of the image using an object recognition algorithm.

18. A method for imaging, the method comprising:

receiving an image captured by an image sensor;

analyzing features of the image to determine that an image region in the image includes a representation of an object of a predetermined category, wherein a hue of at least one pixel of the representation of the object in the image region is outside of a predetermined hue range corresponding to the predetermined category, and wherein the features are distinct from the hue; and adjusting the hue of the at least one pixel of the representation of the object in the image region based on the predetermined hue range to generate a processed image.

19. The method of claim 18, wherein adjusting the hue of the at least one pixel includes:

adjust respective hues of a plurality of pixels of the at least one pixel of the representation of the object toward a hue line, wherein the predetermined hue range corresponds to the hue line that is represented by a predetermined angle in a color circle.

20. The method of claim 18, wherein the predetermined category is skin, wherein the object includes at least a portion of a person, and wherein the predetermined hue range is associated with the skin.

21. The method of claim 20, wherein the portion of the person includes at least one of a face of the person or a hand of the person.

22. The method of claim 18, wherein the predetermined category is plant matter, wherein the object includes at least a portion of a plant, and wherein the predetermined hue range is associated with the plant matter.

23. The method of claim 18, wherein the predetermined category is sky, wherein the object includes a region of the sky, and wherein the predetermined hue range is associated with the sky.

24. The method of claim 18, further comprising:

adjusting a brightness of at least one pixel of the representation of the object in the image region to generate the processed image.

25. The method of claim 18, further comprising:

adjusting a saturation of at least one pixel of the representation of the object in the image region to generate the processed image.

26. The method of claim 18, further comprising:

adjusting a tone of at least one pixel of the representation of the object in the image region to generate the processed image.

27. The method of claim 18, further comprising:

calculating average hue, average saturation, and average brightness for a plurality of bins corresponding to different color ranges in the image;

adjusting the hue based on the average hue to adjust the hue of the at least one pixel and to generate the processed image;

adjusting a saturation of the image based on the average saturation to generate the processed image; and adjusting a brightness of the image based on the average brightness to generate the processed image.

28. The method of claim 18, further comprising:
outputting the processed image.

29. The method of claim 18, further comprising:
applying a color phase correction to the at least one pixel of the representation of the object in the image region to adjust the hue of the at least one pixel of the representation of the object in the image region and to generate the processed image.

30. A non-transitory computer-readable medium having stored thereon instructions that, when executed by one or more processors, cause the one or more processors to:
receive an image captured by an image sensor;
analyze features of the image to determine that an image region in the image includes a representation of an object of a predetermined category, wherein a hue of at least one pixel of the representation of the object in the image region is outside of a predetermined hue range corresponding to the predetermined category, and wherein the features are distinct from the hue; and
adjust the hue of the at least one pixel of the representation of the object in the image region based on the predetermined hue range to generate a processed image.

* * * * *